(12) United States Patent
Toomey

(10) Patent No.: US 6,841,781 B2
(45) Date of Patent: Jan. 11, 2005

(54) WATER DETECTION AND SOURCE IDENTIFICATION METHODS FOR STRUCTURES USING ELECTROMAGNETIC RADIATION SPECTROSCOPY

(76) Inventor: Patrick J. Toomey, 665 Wheeler Peak Way, Alpharetta, GA (US) 30022

( * ) Notice: Subject to any disclaimer, the term of this patent is extended or adjusted under 35 U.S.C. 154(b) by 0 days.

(21) Appl. No.: 10/075,728

(22) Filed: Feb. 12, 2002

(65) Prior Publication Data

US 2002/0096638 A1 Jul. 25, 2002

Related U.S. Application Data

(63) Continuation of application No. 09/338,906, filed on Jun. 23, 1999, now abandoned.

(51) Int. Cl.$^7$ ............................................... G01N 21/35
(52) U.S. Cl. ............................... 250/341.1; 250/339.1; 250/339.12; 250/341.8
(58) Field of Search ........................... 250/341.1, 339.1, 250/341.8, 339.11, 340

(56) References Cited

U.S. PATENT DOCUMENTS

| | | | | | |
|---|---|---|---|---|---|
| 3,791,097 A | * | 2/1974 | Cassella et al. | .......... | 52/745.06 |
| 4,300,049 A | * | 11/1981 | Sturm | .................... | 250/339.09 |
| 4,336,459 A | * | 6/1982 | Fay | .......................... | 250/459.1 |
| 4,345,840 A | * | 8/1982 | Goetz et al. | ................. | 356/407 |
| 4,510,072 A | * | 4/1985 | Young et al. | ................ | 252/380 |
| 4,874,572 A | * | 10/1989 | Nelson et al. | ............... | 376/256 |
| 5,200,615 A | * | 4/1993 | Hopenfeld | ................... | 250/302 |
| 5,721,430 A | * | 2/1998 | Wong | ..................... | 250/339.13 |
| 5,886,636 A | * | 3/1999 | Toomey | ....................... | 340/602 |

FOREIGN PATENT DOCUMENTS

| | | | | | |
|---|---|---|---|---|---|
| DE | | 3204146 A1 | * | 8/1983 | .......... G01N/21/21 |
| DE | | 19520035 C1 | * | 11/1996 | .......... G01N/21/35 |
| GB | | 2303444 A | * | 2/1997 | ............ G01J/3/427 |
| JP | | 06201625 A | * | 7/1994 | .......... G01N/25/72 |

OTHER PUBLICATIONS

'MoistureVision'. MoistureVision [online]. [2001. retrieved on Jun. 14, 2002]. Retrieved from the Interent <URL: http://www.moisturevision.com>.*

'Inspection'. MoistureVision [online]. 2001. [retrieved on Jun. 14, 2002]. Retrieved from the Internet <URL: http://www.moisturevision.com/res/inspections/index.html>.*

(List continued on next page.)

Primary Examiner—Albert Gagliardi
(74) Attorney, Agent, or Firm—Eliza Stefaniw

(57) ABSTRACT

A method of the present invention includes exposing a structure to first electromagnetic radiation including at least one wavelength absorbed by a predetermined substance that is to be detected. Such substance can be water, a water-soluble substance, or fungi, the presence of which can be a significant problem in a structure such as a house or building. The method includes sensing second electromagnetic radiation from the structure, the second radiation based on the first radiation. The method also includes determining whether the substance is present in the structure, based on the sensed second radiation. If the substance to be detected is water and the determining step reveals a water-suspect area in the structure, the method can include testing the water-suspect area of the structure to determine whether water is present therein. If water is confirmed by the determination to be present in the structure, the method can include a step of determining the source of the water. Proper identification of the source of a water problem permits appropriate measures to be taken to correct the water problem. The invention also includes similar methods for the detection of a water-soluble substance in a structure, such as carbonate, phosphate, sulfate, chloride or other minerals indicative that ground water is the source of a water problem. The invention also includes a similar method for the detection of fungi which grows in moist areas of a structure, to which many people are allergic.

19 Claims, 14 Drawing Sheets

OTHER PUBLICATIONS

'About Us'. MoistureVision [online]. 2001. [retrieved on Jun. 14, 2002]. Retrieved from the Internet <URL: http://www.moisturevision.com/index_old.html>.*

'Clients'. MoistureVision [online]. 2001. [retrieved on Jun. 14, 2002]. Retrieved from the Internet <URL: http://www.moisturevision.com/res/clients/testimonials.html>.*

J. A. Gardecki and M. Maroncelli, "A Set of Secondary Emission Standards for Calibration of the Spectral Responsivity in Emission Spectroscopy," Applied Spectroscopy vol. 52, No. 9. pp. 1179–1189.

Near Infra–Red Reflectance MOisture Analyzer Technology Measuring Principle, NIR Moisture Tech Info. retrieved on May 19, 1999from Internet website http:://www.analyticon.com/aicprods/moisture/nitech.htm.

Application of Gamma–Ray Spectrometry and Electrical Resistivity Imaging Technique to Detect Subsurface Karst Structure in Pokhara Valley, Central Nepal. Pitambar, Surendra, and Hisao. Retrieved from Internet on May 11, 1999.www.hokudai.ac.jp/index–e.html. PublishedL Oct. 19, 1998.

W. Tobiasson and J. Ricard; The Roofing Industry Educational Institute; "Moisture Gain and its Thermal Consequence for Common Roof Installations" US Army Cold Regions Research and Engineering Laboratory Paper 2 (pp. 1–15) Apr. 19–20, 1979.

Nick Short and Jon Robinson; Remote Sensing and Photo Interpretation Tutorial; Nov. 118, 1996; Internet capture from http://www. metacator.upe.es.

Robert Nemifoff (MTU) and Jerry Bonnell (USRA); Astronomy Picture of the Day; "The Water Vapor Channel"; Internet http://www.antwrp.gsfc.nasa.gov/apod/ap990904.html; date of capture May 9, 1998.

Asmospheric Transmission; Centre National de la Recherche Scientifique, France; reprinted on May 16, 1999.

N.P. Barnes; "NASA Langley Demonstrates Compositional Tuning of Lasers" retrieved from Internet on Jan. 15, 1999 at http://www.nasa.gov.

David A. Neuffeld, et al.; "Detection of Far Infrrared Rotation Lines of Water Vapour Toward W. Hydraw"; Nov. 1996 Internet capture May 16, 2002;http://www.adsabs.harvard.edu/cgi–bin/nph–bib.

A. Krier, et al.,: "Novel 2.7 Micron LEDs for Water Vapor Detection Based on In0.87Ga0.13Aw/InAs0.70P0.30 Grown by MBE on InP Using Strain Relaxed Buffer"; 1998; http://www.adsabs.harvard.edu/cgi–bin/nph–bib.

Medical Lasers; reprinted on May 20, 1999 from Internet website http://koruslaser.com/koruslaser/com/medical.htm.

Keith E. Miller et. al., Northwestern University; "Forrescence Sensors for In Situ; Monitoring of Water Sorption in Bridge Coatings" retrieved from Internet http://www.iti.nwu.edu/pubs/tr7.html. May 16, 1999.

Stacy MacDonald and Pamela Keating; "The Use of Shift Reagents in Near–Infrared Spectrometry"; retrieved from Internet http://rustico.chem.indiana.edu/hieftje/SAM-PRK.htm on May 19, 1999.

"Thermal Emissivity Spectra of Carbonates" retrieved from Internet website http://emma.la.asu.edu/–lane/carb.htm on May 19, 1999.

"Thermal Emissivity Spectra of Sulfites, Phosphate, and Chlorides" retrieved from Internet website http://emma.la.asu.edu/–lane/sulphoschl.htm on May 19, 1999.

ASD: Field Spectrradiometry for Satellite Remote Sensing; Analytical Spectral Devices, Inc. "Field Spectrometry: Techniques and Instrumentation" retrieved on May 19, 1999 from Internet website http://www.asdi.com/apps/remote_sensing.html (pp. 1–12).

ASD; Spectra of Water Phases; Analytical Spectral Devices, Inc.; "Spectroscopy of Solid, Liquid and Vapor Water Phases" retrieved on May 19, 1999 from Internet website http://www.asdi.com/apps/water_phases.html (pp. 1–6).

Benchtop Hyperspectral Turnkey Systems; "Turnkey Benchtop Hyperspectral Systems for Field or Laboratory Use" retrieved from Internet on May 14, 1999.

Zeltex, Inc.; KJE–100; Specification retrieved from Internet on May 14, 1999 http://zeltex.com.

AeroTech Monitor; "Mycotoxins"; Aerotechlabs, retrieved on May 11, 1999 from Internet http://www.aerotechlabs.com.

PulsIR—Pulsed Infrared Radiator; Icon Optics, Inc,; Boston Electronics Corporation; specifications retrieved on May 14, 1999 from Internet; www.boselec.com; (pp. 1–4).

Boston Electronics Corporation; Free Product Literature and Free Literature Available; Linecard retrieved Jul. 24, 1998 from Internet; boselec@worldstd.com/c/catalog.shtml (pp. 1–2).

Engineering Related News; ENR; "Containing Noxious Mold" Cover Story Indoor Air Quality; May 3, 1999 (pp. 1–6).

* cited by examiner

WATER DETECTION AND SOURCE IDENTIFICATION METHODS FOR STRUCTURES USING ELECTROMAGNETIC RADIATION SPECTROSCOPY

CROSS-REFERENCE TO RELATED APPLICATION

This application is a continuation under 37 C.F.R. §1.53 (b) of U.S. application Ser. No. 09/338,906 filed Jun. 23, 1999, now abandoned naming as sole inventor Patrick J. Toomey, and claiming priority benefits under Title 35, United States Code §120 to such application.

BACKGROUND OF THE INVENTION

1. Field of the Invention

The invented methods are directed to the detection and identification of the source of a water problem in a house, building or other structure. The invented methods are further directed to the detection of mold and fungi which inhabit moist predetermined areas of structures, and which can pose health concerns to persons living or working in their presence.

2. Description of the Related Art

The presence of a water problem in a structure is often difficult to detect before damage becomes so extensive that it is apparent to the unaided eye. In many cases, water seeps inside of a wall, ceiling, floor, roof or foundation of a structure such as a building or house, and causes widespread damage before the problem is noticeable. By the time the water damage is visible, repairs to fix the structure are often far more costly than they would be if the water problem could be detected at an earlier stage. It would therefore be desirable to detect the presence of a water problem in a structure at a relatively early stage in its development so that such problem may be more readily corrected, possibly at greatly reduced expense.

In addition, numerous home and building owners have incurred the expense and inconvenience of repeatedly repairing a structure in an effort to correct a water problem, only to find the same problem recurring after repairs are made. It would be desirable to detect the presence of moisture in a structure, even in areas not visible to the unaided eye, to properly identify the source of a water problem so that effective repair measures can be used to correct the water problem.

Another problem that is related to this invention concerns the limited area covered by most conventional moisture-detection devices such as capacitance meters. More specifically, the coverage predetermined area of such devices is generally less than one-hundred centimeters. The use of such devices to detect moisture in a structure containing hundreds to many thousands of square meters is clearly impractical. It would be desirable to provide a method capable of detecting moisture in relatively large areas of a structure with less need to reposition moisture detection equipment used to scan such areas. It would also be desirable to provide the capability to detect moisture in relatively large areas of a structure so that inspection of a structure can be performed more rapidly than is possible with conventional devices and techniques.

Apart from the damage caused by water directly by rotting or otherwise deteriorating the material composing a structure, the presence of water in a structure can lead to many other problems. For example, pests such as termites are attracted to moist wood in structures. Termites are capable of undermining a structure in a short period of time. The detection of a water problem in a structure, even if latent, would therefore be beneficial to stop or prevent pest infestation in a structure. Other problems associated with the presence of moisture in a structure include the so-called "sick home" syndrome. More specifically, moist and dark areas of a structure such as a house or building often provide environments conducive to growth of fungi or molds to which many persons are allergic. Numerous instances have been reported in which persons living in houses or working in buildings have been made ill by fungi growing in the structure, in some cases resulting in death. In an effort to correct a water problem involving Fungi, some building owners have spent in excess of the original building cost. It would therefore be desirable to detect and correct a water problem not only to prevent damage caused directly by water in a structure such as by rotting, but also to allow detection and correction of such problem to eliminate the indirect consequences of a water problem, such as pest or mold and fungi infestation.

Also related to the present invention is the general field of spectroscopy. Spectroscopy is basically the study of how electromagnetic radiation interacts with matter. Generally speaking, spectroscopy can be performed in one of two techniques. In the first technique, a substance is exposed with electromagnetic radiation generally with a broad spectrum of wavelengths. The substance will absorb electromagnetic radiation energy at discrete wavelengths which are highly indicative of the identity of the substance, particularly if its atomic structure is relatively simple. An unknown substance can therefore be identified by exposing the substance with a broad spectrum of electromagnetic radiation wavelengths and determining those wavelengths at which the substance absorbs electromagnetic radiation energy, i.e., its absorption spectra. The second technique involves the excitation of a substance with electromagnetic radiation or other form of energy. The substance can absorb the electromagnetic radiation and be brought to an excited state. Upon returning to its ground state, the substance emits radiation at certain discrete wavelengths that are highly characteristic of the substance. An unknown substance can therefore be identified by its emission spectra. The emission wavelengths of a substance generally closely correspond to its absorption wavelengths, but will generally also include additional wavelengths that are not included in the substance's absorption spectrum. While spectroscopy is a useful science and has been used widely in many different applications, its use relative to structures such as a building or house to detect a water problem, substances that indicate the source of the water problem, or mold and fungi, has not been known.

SUMMARY OF THE INVENTION

An object of the invention is to detect the existence of a water problem in a structure.

Another, more specific object of the invention is to detect a water problem in a structure at a relatively early stage, even if the problem is latent, so that the water problem can be corrected before the structure incurs relatively extensive damage requiring costly repairs.

A further object of the invention is to correctly identify the source of a water problem in a structure to permit appropriate corrective action and/or repairs to be made to fix the problem.

An additional object of the invention is to sense the presence of water over a relatively large area of the structure to reduce the need to reposition testing equipment and to permit the structure to be scanned in a relatively rapid manner.

Another object of the invention is to effectively detect and identify the source of a water problem so that such problem can be corrected to reduce likelihood of infestation by termites or other pests, or molds or other fungi.

A further object of the invention is to effectively detect and identify the presence of mold or fungi in a structure.

The present invention overcomes the above-noted disadvantages, and attains the objects and advantages set forth above. Broadly stated, the method of the present invention includes exposing a predetermined area of the structure with electromagnetic radiation including at least one wavelength that is significantly absorbed by a predetermined substance such as water, a water-soluble substance such as carbonate, phosphate, sulfate, or chloride minerals, or fungi which grows in moist areas of a structure. The method also includes sensing the electromagnetic radiation from the exposed predetermined area of the structure, which results from the radiation used to expose the structure. The method also includes determining whether the substance is present in the structure, based on the sensed electromagnetic radiation.

A relatively specific embodiment of the method exposing a predetermined area of the structure with electromagnetic radiation including at least one wavelength that is significantly absorbed by water. The method also includes sensing the electromagnetic radiation from the exposed area of the structure, the sensed radiation based on the radiation used to expose the area of the structure. The method also includes determining whether the exposed area of the structure includes a water-suspect area, based on the sensed electromagnetic radiation. If the determination reveals the presence of a water-suspect area in the structure, the method can include testing the water-suspect area of the structure to determine whether water is in fact present therein. If so, the method can include determining the source of the water. Proper identification of the source of a water problem permits appropriate measures to be taken to correct the water problem.

Another relatively specific embodiment of the method can be used to detect whether a water-soluble substance (such as carbonate, phosphate, sulfate, or chloride minerals) is present in the structure, indicating that ground water is the likely source of water intrusion in the structure. Conversely, the absence of such water-soluble substance is highly indicative that the water source is not ground water. The method includes exposing a predetermined area of the structure with electromagnetic radiation including at least one wavelength significantly absorbed by the water-soluble substance. The method also includes sensing electromagnetic radiation from the exposed area of the structure, the sensed radiation based on the radiation used to expose the structure. The method also includes determining whether the water-soluble substance is present in the structure, based on the sensed electromagnetic radiation. The method can include determining that the source of water is ground water if the water-soluble substance is present in the exposed predetermined area of the structure. The method can also include determining that the source of the water is not ground water if the water-soluble substance is not present in the exposed predetermined area of the structure.

Another relatively specific embodiment of the method includes exposing a predetermined area of a structure with electromagnetic radiation including at least one wavelength significantly absorbed by fungi. The method also includes sensing electromagnetic radiation from the exposed area of the structure, the sensed radiation based on the radiation used to expose the structure. The method also includes determining whether fungi is present in the structure, based on the sensed electromagnetic radiation.

These together with other objects, features and advantages of the invention will become subsequently apparent, and reside in the details of construction and operation as more fully hereinafter described and claimed, reference being made to the accompanying drawings, forming a part hereof wherein like numerals refer to like parts throughout the several views.

DESCRIPTION OF THE PREFERRED EMBODIMENTS

Figure 1:
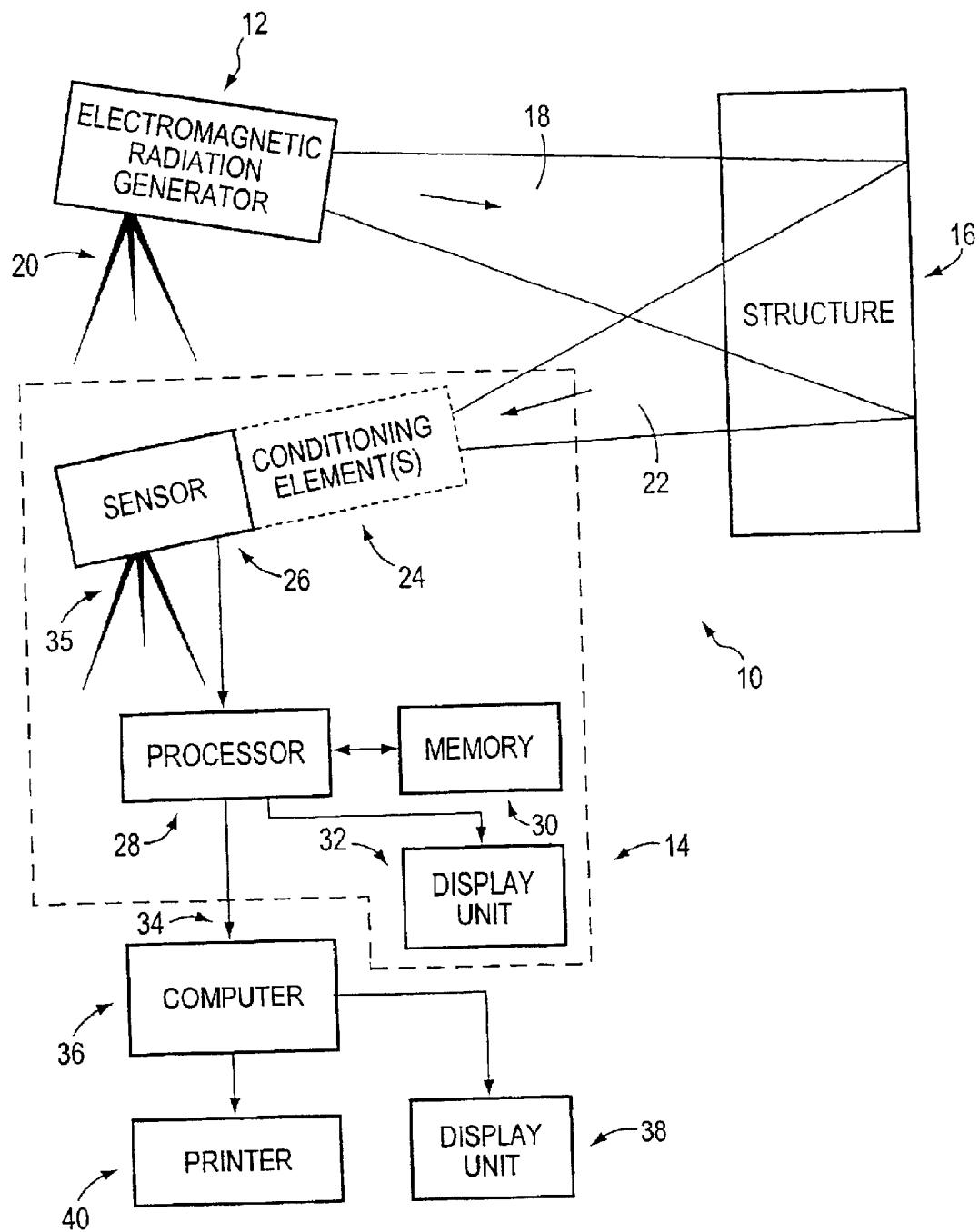
FIG. 1 is a view of a first arrangement of a system that can be used to perform the invented methods.

As used herein, the following terms and phrases have the following meanings:

"A radiation wavelength that is significantly absorbed by water" means a radiation wavelength that water absorbs to a degree that can be sensed and distinguished as characteristic of water. As is well understood in the field of spectroscopy, the wavelength significantly absorbed by water is preferred to be at or near the center of a peak or maximum in the absorption spectrum of water.

"A radiation wavelength that is not significantly absorbed by water" means a radiation wavelength at or near the center of a valley or minima in the absorption spectrum of water.

"A radiation wavelength that is significantly absorbed by water vapor" means a radiation wavelength that water vapor absorbs to a degree that can be sensed and distinguished as characteristic of water vapor. The wavelength significantly absorbed by water vapor is preferred to be at or near the center of a peak or maximum wavelength range in the absorption spectrum of water.

"A radiation wavelength that is not significantly absorbed by water vapor" at or near the center of a valley or minima in the absorption spectrum of water.

"A radiation wavelength that is not significantly absorbed by the material composing the structure" means a radiation wavelength at or near the center of a valley or minimum in a wavelength range in the absorption spectrum of such material.

"Detection wavelength" means the wavelength at which sensing of the radiation from the structure is performed, and is either the same wavelength as the exposure wavelength or the emission wavelength.

"Emission wavelength" means a wavelength at which radiation is emitted as a result of absorption of energy at the exposure wavelength in a substance such as water, water vapor, a water-soluble substance, or fungi.

"Exposure wavelength" means an electromagnetic radiation wavelength absorbed by a substance such as water, water vapor, a water-soluble substance, or fungi.

"Reference wavelength" is a wavelength that is not significantly absorbed by a substance such as water, water vapor, a water-soluble substance, or fungi if the detection wavelength is one at which the degree of absorption is to be determined. If the detection wavelength is an emission wavelength, the reference wavelength is one at which no significant emission occurs from the substance under analysis upon exposure to radiation at the exposure wavelength, and that is also not significantly absorbed by the material composing the structure.

"Material" as used herein refers to construction materials such as wood, brick, stone, drywall or sheet rock, panels of vinyl or stucco, or other materials used in the construction of a structure such as a building or house.

"Substance" as used herein can be either water, water vapor, a water-soluble substance, or fungi.

"Water" as used herein means water in its liquid phase unless the context used herein indicates its use in a general sense, in other words, water whether in liquid, gas, or solid form.

"Water vapor" refers to water in its liquid phase.

A System for Use in Performing the Methods

In FIG. 1, a system 10 that can be used to perform the invented methods, is shown. The system 10 generally includes an electromagnetic radiation generator 12 and a sensor unit 14 used to determine whether a water-suspect area exists in an predetermined area of the structure 16, and/or to determine the presence of a water-soluble substance and/or fungi. The structure 16 can be a house, building or other structure. The electromagnetic radiation generator 12 generates electromagnetic radiation 18 that includes at least one exposure wavelength(s) that is significantly absorbed by the substance that is to be detected (i.e., water, water-vapor, water-soluble substance or fungi) and at least one reference wavelength that is not significantly absorbed by such substance. The exposure and reference wavelengths are predetermined to be wavelengths that are not significantly absorbed by the material composing the structure 16. The generator 12 can generate the exposure and reference wavelengths in a range from $10^{-2}$ micrometers to $10^8$ micrometers, for example, although other appropriate wavelengths can be used. The exposure and reference wavelengths of the radiation generated by the generator 12 can be at wavelengths in the ultraviolet (UV), visible (VIS), infrared (IR) and/or radio-wave range. The exposure and reference wavelengths are preferred to be wavelengths that penetrate relatively deeply into the structure material so that areas of the structure hidden from view by the unaided eye can be analyzed for the presence of a particular substance to be detected. The generator 12 can be a unit that generates a relatively broad spectrum of wavelengths. For example, the generator 12 can be a lamp in the form of a light bulb (e.g., a quartz halogen-type lamp) that optionally includes a reflector to intensify and direct the radiation generated by the lamp in a predetermined direction. The lamp and reflector are commercially-available from various suppliers of the sensing unit 14, or from a wide variety of other commercial sources. The generator 12 can also be a unit that generates electromagnetic radiation at relatively specific wavelengths, such as a laser. For some exposure and reference wavelengths, it may not be possible to select a commercially-available laser or to construct such laser to inherently operate exactly at such wavelengths. In this case, the laser can include tunable elements to permit adjustment of the wavelength of the radiant energy generated by the laser to coincide or nearly coincide with the exposure and reference wavelengths. Alternatively, a laser can be selected from commercially-available units or can be constructed to generate a wavelength sufficiently close to the exposure wavelength to permit absorption of radiant energy at the exposure wavelength if water is present in the structure. Similarly, a laser can be selected from commercially-available units or can be constructed to generate a wavelength sufficiently close to the reference wavelength so that it is not significantly absorbed by water if present in the structure. Many commercially-available lasers include a calibration sensor that can be used to adjust the wavelength of the electromagnetic radiation generated by such lasers. Because lasers generally generate radiation with a relatively narrow beam width, a beam expander or pin-hole or slit grating (not shown) can be used to enhance a laser's beam width to expose a relatively large area of the structure 16. The generator 12 can also include a source of radiowaves. To simplify determination of the area of the structure that is exposed with the generator 12, the generator 12 can generate electromagnetic radiation in the VIS range as part of the exposure wavelength or in addition to the exposure wavelength to permit a human user to see the exposed area of the structure. Alternatively, the generator 12 can be provided with a view finder similar to those commonly used in cameras to permit the exposed area of the structure to be determined. The system 10 can include a photographer's stand 20 of a type commonly used and commercially-available for videotaping in the television industry, or a tripod, for example. One or more lamps or lasers of the generator 12 can be installed in and supported by the stand 20. The intensity of the radiation generated by the generator 12 should of course be sufficient to permit detection of the presence of water, a water-soluble substance and/or fungi in the structure 16, but must not be so intense as to significantly evaporate water present in the exposed area of the structure, an occurrence which could disguise a water problem. In general, the output power of the generator 12 can be in a range from ten (10) to one-thousand (1,000) Watts. The stand can be positioned at a location in contact with the structure to a location that is as much as about five to ten meters from the area of the structure under analysis. In general, the closer the generator 12 is positioned to the structure, the less the intensity required for the radiation output by the generator. Conversely, in general, the farther the generator 12 is positioned from the structure 16, the greater the intensity required for the radiation 18 generated by the generator 12. If the system 10 is to detect radiant energy reflected from the structure, the generator 12 can be positioned at an angle of thirty (30) degrees of angle relative to a wall surface, for example, so that the electromagnetic radiation from the generated glances from the structure. The generator 12 can be powered by electrically coupling the generator to an electrical wall outlet (not shown) of the structure with an extension cord or wiring (not shown), or can be powered by electrically coupling the generator to a portable electrical power generator or battery (not shown).

The generator 12 is positioned on the stand 20 to expose a predetermined area of the structure 16 to the radiation 18 that is generated by the generator at exposure and reference wavelengths. In FIG. 1, the sensor unit 14 is positioned to receive and sense electromagnetic radiation 22 from the structure 16, the radiation 22 being derived from the radiation 18. The sensor unit 20 can detect the intensity of the radiation 22 at a detection wavelength. The detection wavelength can be the same as the exposure wavelength if the degree of absorption of the exposure wavelength is to be used to detect the presence of a substance (i.e., water, water vapor, water-soluble substance or fungi). In this case, the radiation 22 can be a portion of the electromagnetic radiation 18 that is not absorbed in the structure 16 and that is reflected from the structure 16, as shown in FIG. 1. The detection wavelength can also be an emission wavelength of water that is excited by the exposure wavelength in the radiation 18. The emission wavelength is generally different from the exposure wavelength. If the substance to be detected is present in the structure, the water molecules absorb the radiation at the exposure wavelength and emit energy received in the exposure wavelength at an emission wavelength that can be sensed by the sensor unit 14 via the radiation 22 to determine whether a the substance is present or suspected to be present in the exposed area of the structure 16. The sensor unit 14 can also sense the radiation 22 received by the sensor unit at the reference wavelength whose intensity is proportional to that of the radiation 18 if the degree of absorption is to be detected at the detection wavelength, or can be a wavelength at which significant emission does not occur if the detection wavelength is an emission wavelength. Accordingly, the reference wavelength serves as a measure of the radiation 18 incident to the structure 16 against which the intensity of the radiation 22 at the detection wavelength can be gauged.

The sensor unit 14 can include conditioning element(s) 24 and sensor(s) 26 which are arranged to receive radiation 22 from the conditioning element(s). The conditioning element(s) 24 can include one or more filters or gratings to receive and pass the detection and reference wavelengths in the radiation 22, but which reject other wavelengths. The conditioning element(s) 24 can also include a prism or like element to separate received radiation 22 into different wavelengths for supply to different sensors 26 sensitive to different wavelength ranges, for example. The conditioning element(s) 24 can also include one or more lenses to focus light on the sensors 26, or can include one or more mirrors to guide the radiation 22 along an optical path traveled by such radiation to the sensor(s) 26.

The sensor(s) 26 can generate at least one signal, based on the intensity level(s) of the radiation 22 at the detection wavelength(s), and at least one signal based on the intensity level(s) of the radiation 22 at the reference wavelength(s). The sensor(s) 26 can include one or more photodiodes arranged in an array, a charge-coupled device (CCD), and/or a charge-injected device (CID). The sensor(s) 26 can also include various sensors used in radiometers to sense radiowaves. If the sensor(s) 26 is sensitive to a relatively narrow band of wavelengths, such sensor(s) should be selected from among commercially-available sensor(s) or constructed to be sensitive to the exposure and reference wavelengths. The sensor(s) 26 can also include tunable or wavelength-adjustment elements to adjust such sensor(s) to be sensitive to the exposure and reference wavelengths. The sensor(s) 26 can detect the radiation 22 over a relatively large field of view of the exposed predetermined area of the structure 16, for example, of about a square meter to several square meters or more. This permits a relatively large area of the structure to be analyzed for the presence of a substance in a single exposure so that comparatively less repositioning of the generator 12 and the sensor unit 14 is required to scan a portion of the structure for the presence of a particular substance. The sensor unit 14 can include a processor 28 coupled to receive the signals from the sensor(s) 26. The processor 28 can be a microprocessor or microcontroller, for example. The sensor unit 14 can also include an analog-to-digital converter (not shown) coupled between the sensor(s) 26 and the processor 28, to convert the signals from the sensor(s) 26 from analog signals into digital data. The sensor unit 14 can also include a memory 30 coupled to the processor 28, that can receive and store data representing the detection and reference wavelength intensity level data for the radiation 22, as well as a control program pre-stored in the memory 30 that controls the operations of the processor 28, and data signals generated by the processor 28 based on the intensity level data. The processor 28 can be pre-programmed to compare the intensities of the detection and reference data levels. If the detection and reference levels differ by a predetermined amount stored in the memory 30, the processor 28 can generate a data signal to indicate that a particular substance is present, or is suspected to be present, in the predetermined area of the structure exposed by the generator 20. Conversely, if the processor 28 determines that the detection and reference level data do not differ by the predetermined amount data, the processor 28 can generate a signal to indicate that no such substance is present in the exposed predetermined area of the structure. The predetermined amount data is determined based on the absorption or emission spectra at the detection and reference wavelengths, and serves as a threshold level against which the difference of the detection and reference wavelength intensity level data can be gauged to determine whether the substance is present in the exposed area of the structure 16. The amount data is predetermined based on the relative difference of the absorption or emission spectrum of the absorption or emission phenomenon to which the detection and reference wavelengths are related. Such amount data can also be predetermined to account for the capability of the generator 12 to generate the radiation 18 at the detection and reference wavelengths, the sensitivity and wavelength resolution capability of the sensor unit 14 at the detection and reference wavelengths, and other factors well-known to those of ordinary skill in this technology. The sensor(s) 26 can be such as to generate signals based on the radiation 22 that are arrays of pixel data representing images of the exposed area of the structure at the detection and reference wavelengths. The processor 28 can be pre-programmed to receive the arrays of pixel data from the sensor(s) 26, and to repeatedly perform comparisons of the detection and reference data levels for corresponding pixels of the arrays generated by the sensor(s) 26 at the detection and reference wavelengths. The processor 28 can generate signal(s) or image data that is an array of pixel data indicative of whether a particular substance (e.g., water, water vapor, a water-soluble substance or fungi) is present in the structure at each pixel of such array. The processor 28 can also store the generated image data in the memory 30 for later retrieval. In addition, the processor 28 can repeatedly perform for comparisons of a plurality of different detection and reference wavelengths to generate signals or image data that indicate whether the substance exists for the pixel data of the arrays resulting from such comparisons. The sensing unit 14 can include a display unit 32 that is coupled to the processor 28. The processor 28 can use the image data it generates to produce a display that indicates areas in which the substance is suspected or determined to be present by the processor 28, and those areas in which the substance is not suspected or determined to be present. The display permits a human user to readily ascertain where a particular substance is or is not present in the exposed area of the structure 16. For example, the human user can use the display as an aid to determine the source of a water problem in the structure 16.

The sensor unit 14 can be one of a variety of commercially available units that includes the sensor(s) 26, but which may or may not include the remaining elements of the sensor unit 14 of FIG. 1, depending upon the particular unit. Such commercially available units include a hyperspectral imaging system from Opto-Knowledge Systems, Inc. of Torrance, Calif., and model no. A109000 sold under the trademark FieldSpec FR from Analytical Spectral Devices, Inc., Boulder, Colo. The hyperspectral system is capable of sensing at a plurality of different detection wavelengths. The hyperspectral imaging system is sold as in a package that includes the generator 12. For the model no. A109000, the generator 12 can be a "high intensity lamp assembly," model no. A126530, commercially available from Analytical Spectral Devices, Inc. The above-listed units generally operate in or near the IR, VIS and UV wavelength ranges. A unit that operates in the radio-wave region is the GZ5 microwave sensing system commercially available from Geozondas, Corporation of Lithuania. Such unit incorporates both the generator 12 and the sensor unit 14. The sensor unit 14 can be supported by a stand 35 such as a tripod, photographer's stand, or other device commercially available from a variety of commercial sources, including suppliers of the generator 12 and/or the sensor unit 14. A user can position the sensor unit 14 on the stand 35 using a view finder mounted to the sensor unit and aligned with the sensor unit's field-of-view. Using the view finder, the user can position the sensor unit 14 to receive electromagnetic radiation 22 from the structure 16 from the area exposed with radiation 18 by the generator 12. Positioning of the sensor unit 14 is simplified to a degree if the generator 12 generates the radiation 18 so that it includes at least some wavelengths in the VIS range so that the user can more readily position the sensor unit 14 on its stand 35 to receive radiation 22 that results from the area of the structure exposed by radiation 18. If the system 10 is to be used to detect electromagnetic radiation reflected from the structure 16, the sensor(s) 26 can be aligned to oppose the generator 12 and about thirty (30) degrees of angle, for example, with respect to the structure's surface to receive electromagnetic radiation from the generator.

The sensor unit 14 can include an external data interface 34 electrically coupled to the processor 28. The external interface 34 can be coupled to supply data from the sensing unit 14, or more specifically, the memory 30 via processor 28, to a computer 36 of the system 10, that is external to the sensing unit 14. The computer 36 can be a personal computer (PC) such as a unit including a microprocessor or microcontroller, such as a Pentium's II or III microprocessor-based unit. In response to command data input by a user via the computer 36 to the processor 28, the processor 28 can be pre-programmed to output data from the memory 30 to the computer 36 via the interface 34. The data output by the processor 28 can include image data indicating water-suspect areas and/or dry areas of the structure, or areas data in which a water-soluble substance or fungi are determined to be present by the sensor unit 14 and those areas where such substance is not present. Alternatively, the data output from the memory 30 via the processor 28 to the computer 36 through the interface 34 can also include intensity level data for the detection and reference wavelengths, optionally in the form of arrays of pixel data, in which case the computer 36 can be pre-programmed to determine areas in which the substance under analysis is present and not present in the exposed area of the structure 16, based on the intensity level data. The computer 36 can generate a display on the display unit 38 to permit a human user to view the image data of the exposed area of the structure, indicating those areas in which a particular substance is present or is not present, based on the intensity level data, in a manner similar to that previously described with respect to the processor 28. The interface 34 is preferred to be detachable (e.g., a cable connection between the processor and computer that can be unplugged) so that the sensor unit 14 and the computer 36 can be disconnected from one another. The use of the interface 34 permits intensity level data to be gathered and stored in the sensor unit 14 in an, on-site inspection of the structure 16, which can then be carried off-site to a remote office, for example, to download the intensity level data into the computer 36 for analysis of the presence of a particular substance in the structure 16. The printer 40 is coupled to the computer 36, and can be used to print the image data indicating areas in which the substance to be detected in the structure is present, and predetermined areas where such substance is not present, for inclusion in a report to the property owner, for example.

Figure 2:
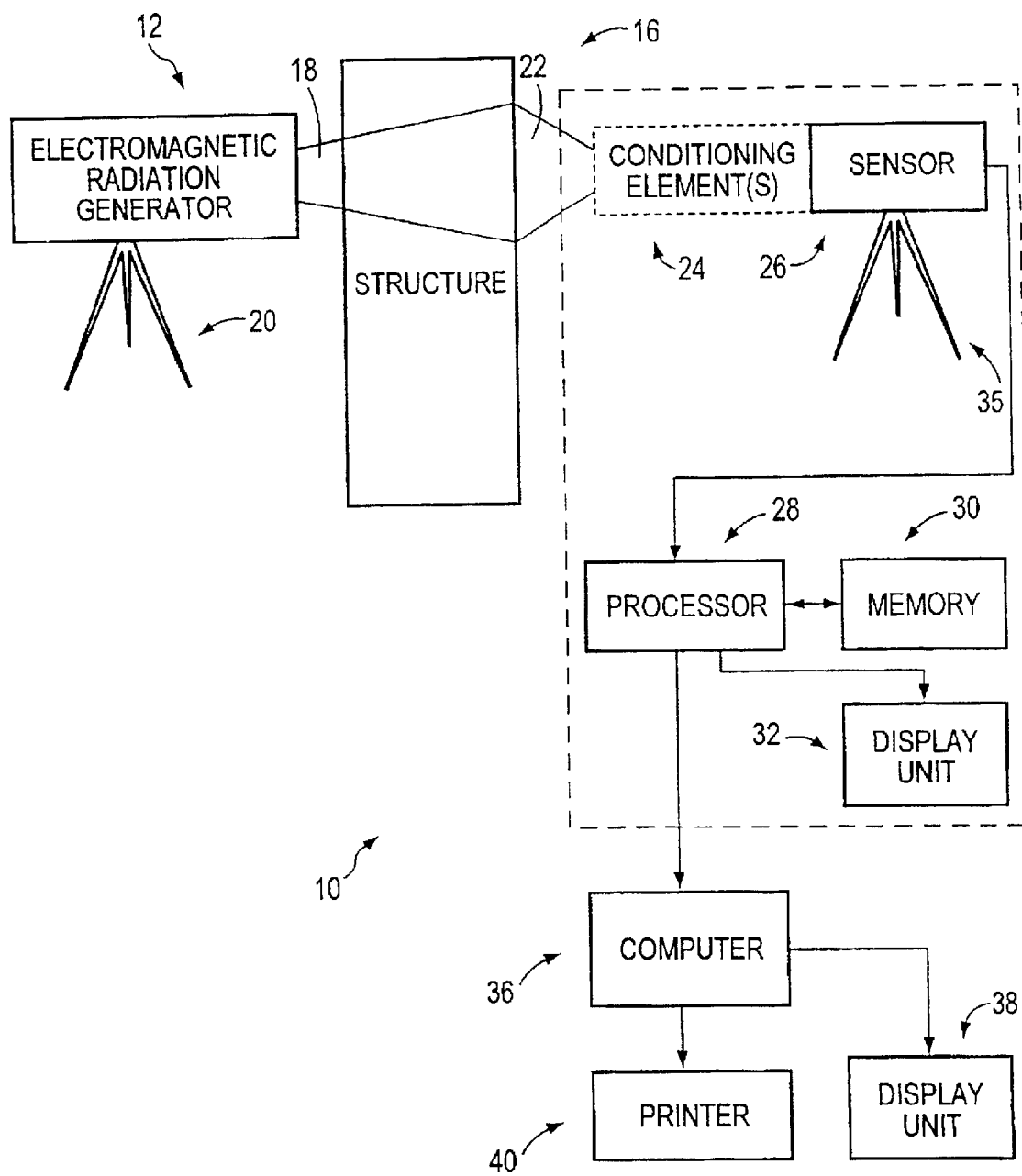
FIG. 2 is a view of a second arrangement of the system.

In FIG. 2, the system 10 is shown in a different arrangement as compared to FIG. 1. More specifically, the generator 12 and the sensing unit 14 are positioned on opposite sides of the predetermined area of the structure 16 to be exposed for analysis. For example, the generator 12 and the sensing unit 14 can be positioned on opposite sides of a wall, floor, ceiling or roof of the structure 16, for example. The generator 12 can be positioned via stand 20 to generate electromagnetic radiation traveling in a direction at least approximately perpendicular to the structure's surface. The sensing unit 14 is positioned to oppose the generator 12 on the opposite side of the structure so that the sensor(s) 26 receive electromagnetic radiation traveling through the structure in a direction at least approximately perpendicular to the structure's surface.

Figure 3:
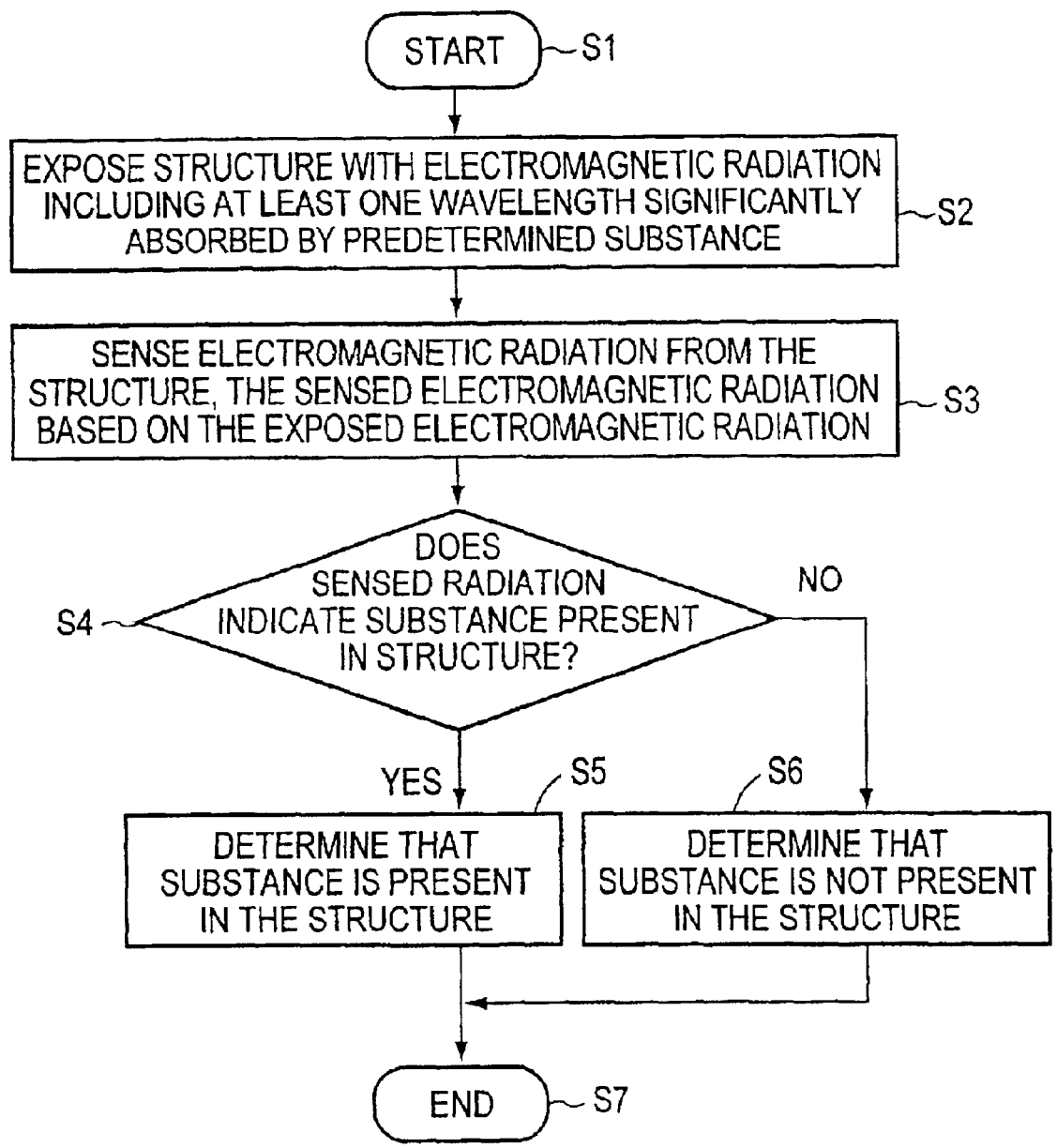
FIG. 3 is a flow chart of a general method of the invention.

General Disclosure of the Method for Detecting Presence (or Absence) of a Substance in a Structure With reference to FIG. 3, the general method of the present invention is now described. The method begins in step S1. In step S2, the structure is exposed to electromagnetic radiation including at least one wavelength significantly absorbed by a predetermined substance. The substance can be water, a water-soluble substance such as carbonate, phosphate, sulfate, or chloride minerals, or fungi that grows in the presence of water. In step S3, electromagnetic radiation is sensed from the structure. The sensed radiation is based on the radiation used to expose the structure, and can be, for example, the unabsorbed portion of the exposed radiation reflected from or transmitted through the structure, or can alternatively be radiation emitted by the substance due to excitation by the radiation used to expose the structure. In step S4, a determination is made to establish whether the sensed radiation indicates that the substance is present in the structure. If the result of the determination of FIG. 3 is affirmative, in step S5, the substance is determined to be present in the structure. On the other, if the determination in step S4 is negative, in step S6, the substance is determined not to be present in the structure. After performance of either steps S5 or S6, the method ends in step S7.

Absorption or emission spectra shift to a degree depending upon the temperature of the substance under analysis. Therefore, it is preferred that the method of FIG. 3, as well as all other methods described herein, be performed at about room temperature (approximately 20° C.). Care should be taken when performing the method on sunny days or in structures with significant amounts of glass because sun light can heat structures to relatively high temperatures which could adversely affect performance of the disclosed methods.

Figure 4:
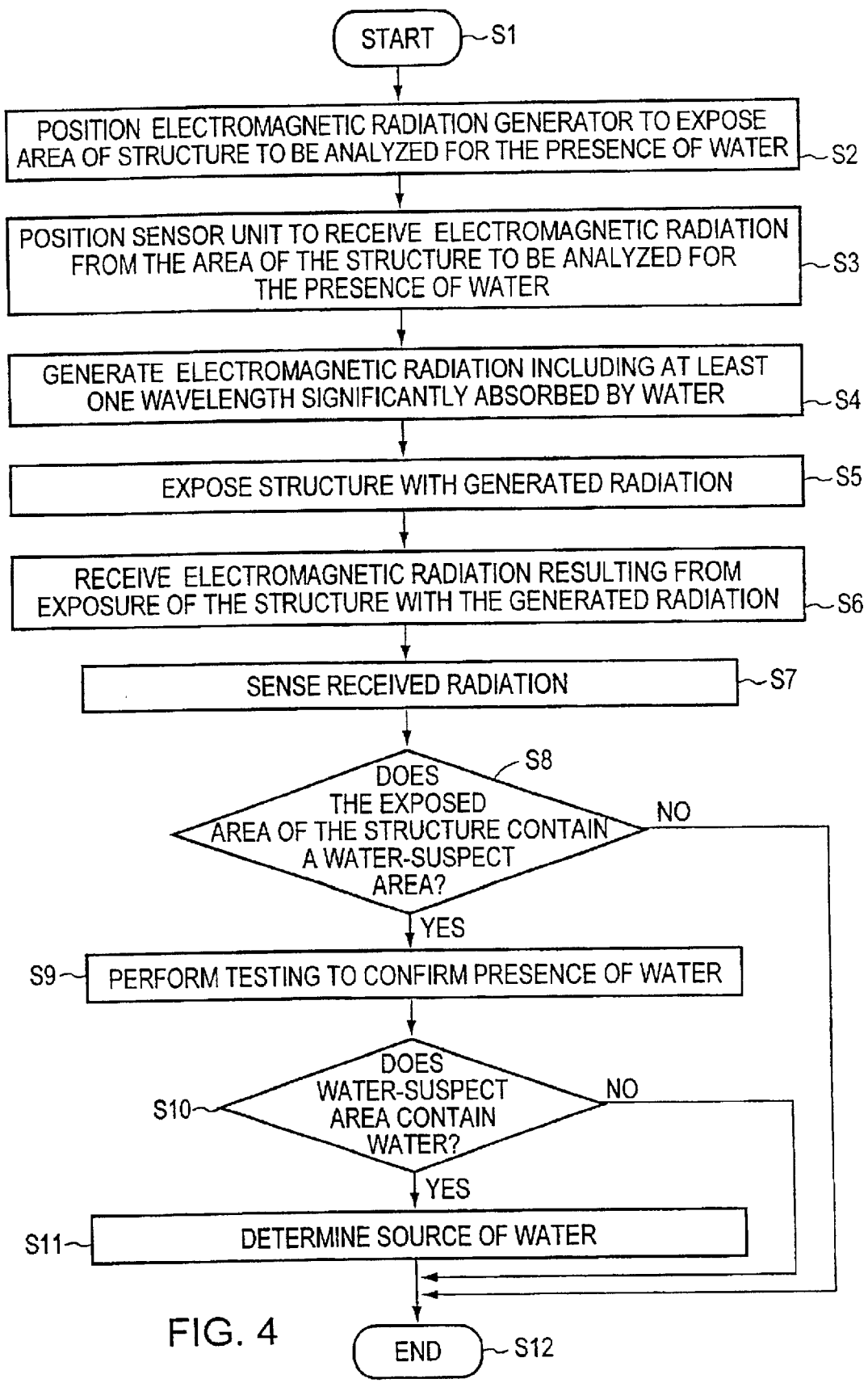
FIG. 4 is a general flow chart of an embodiment of the method for detecting the presence of water in a structure.

General Disclosure of the Method for Detecting Presence (or Absence) of Water in a Structure With reference to FIG. 4, the general method of the present invention is now described. The method begins in step S1. In step S2, the generator 12 is positioned to expose a predetermined area of the structure 16 to be analyzed for the presence of water with radiation 18. In step S3, the sensor unit 14 is positioned to receive and sense radiation 22 from the structure 16. In step S4, the generator 12 generates electromagnetic radiation 18 which includes at least one exposure wavelength that is significantly absorbed by water. In step S5, the structure is exposed with the generated radiation 18. In step S6, the sensor unit 14 receives the radiation 22 from the structure 16, the received radiation based upon or derived from the radiation 18 used to expose the predetermined area of the structure. In step S7, the sensor unit 14 senses the received radiation 22. In step S8, a determination is made to establish whether the exposed area of the structure 16 unit includes a water-suspect area. If the determination in step S8 is affirmative, in step S9, testing is performed to confirm the presence of water in the water-suspect area of the structure. In step S10, a determination is made to establish whether which the water-suspect area does in fact include water. If the determination in step S10 is affirmative, in step S11, the source of the water in the water-confirmed area is determined. After the source of the water problem is determined in step S11 or if the determinations in steps S8 or S10 are negative, in step S12, the method ends. Steps S8–S12 can be performed either by the processor 28, the computer 27 or a human user of the method of FIG. 4.

Figure 5A:
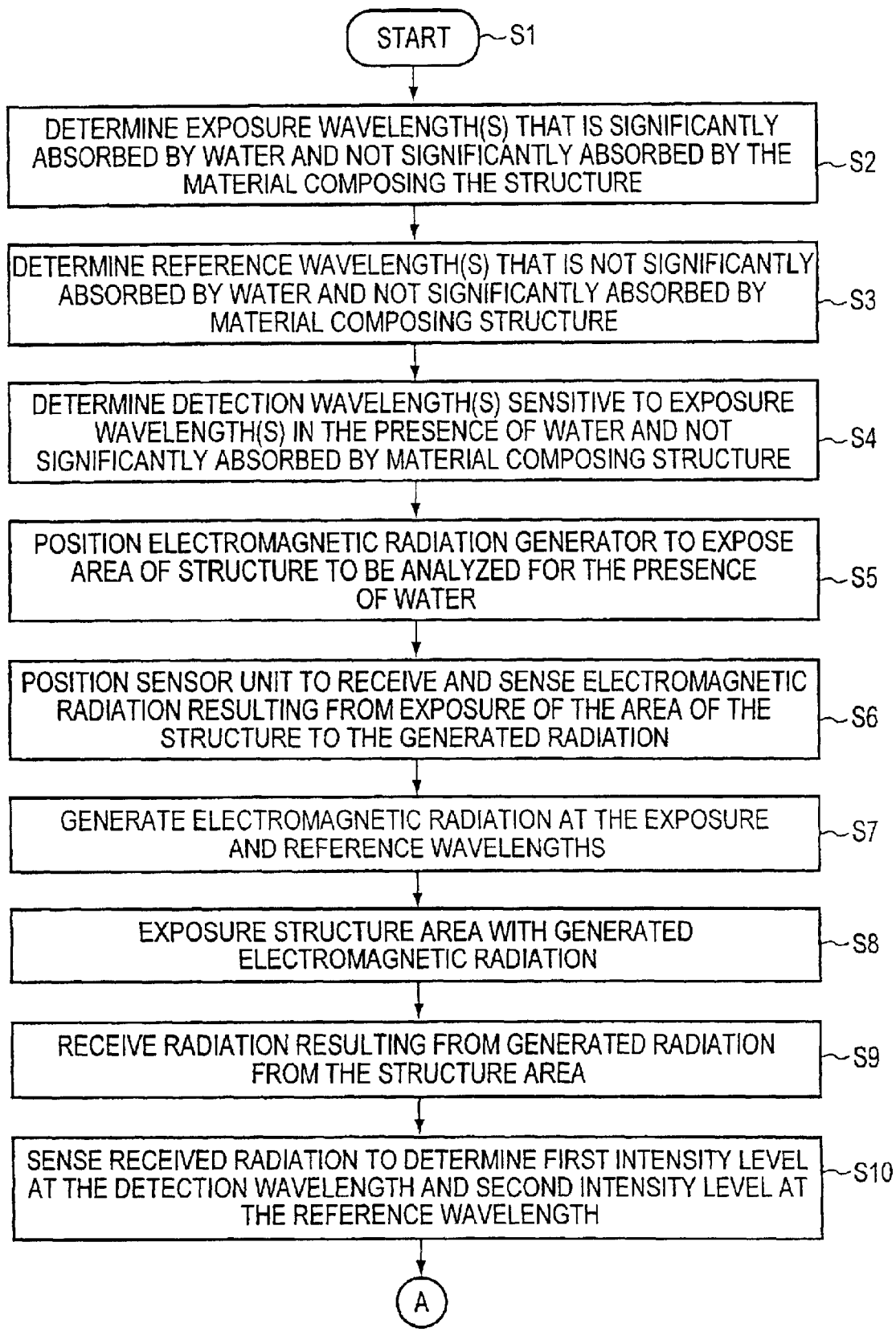
FIGS. 5A and 5B are relatively specific flow charts of an embodiment of the method for detecting the presence of water in a structure which uses an exposure wavelength(s) including at least one wavelength significantly absorbed by water, and a reference wavelength including at least one wavelength not significantly absorbed by water.

Relatively Specific Embodiment of the Method for Determining the Presence (or Absence) of a Water-Suspect Area of a Structure A relatively specific embodiment of the method for determining whether water is present in a structure begins in step S1 of FIG. 5A. In step S2, at least one exposure wavelength is determined to be one that is significantly absorbed by water and not significantly absorbed by the material composing the structure. By way of example and not limitation, the exposure wavelengths can include at least one wavelength at about 0.76, 0.97, 1.19, 1.45, 1.94, 2.55, 2.7, 5.5, or 10.7 micrometers, which are significantly absorbed by water and are generally not significantly absorbed in materials used in structures (for graphs of absorption spectra, see pg. 1957, FT-NIR Atlas, M. Buback and II.P. Vogele, ISBN 3-527-28567-9, VCII Publishers, New York, N.Y.; available on the internet at www.asdi.com). To determine a wavelength that is not significantly absorbed by the material composing the structure, the material composing the structure can be tested with a spectrometer, for example, to determine the absorption spectra of the material at wavelength ranges under consideration for use as the exposure wavelength. By analyzing the material's absorption spectra, an exposure wavelength that is not significantly absorbed by the material can be readily determined. Optionally, the exposure wavelength can be a wavelength that excites emission at an emission wavelength of water.

In step S3, a reference wavelength is determined as a wavelength that is not significantly absorbed by water and is also not significantly absorbed by the material composing the structure. Determination that the reference wavelength is not significantly absorbed by the structure can be performed by using a spectrometer in a manner similar to that used to determine the exposure wavelength. Alternatively, if the detection wavelength is an emission wavelength, the reference wavelength should be one at which no significant emission from waters occurs, and which also is not significantly absorbed by the material composing the structure. For example, the reference wavelength can include at least one wavelength at about 1.06 or 1.66 micrometers, which wavelengths are not significantly absorbed by water.

In step S4, a detection wavelength(s) is determined to be one that is sensitive to the exposure wavelength(s) in the presence of water, and that is not significantly absorbed by the material composing the structure. The detention wavelength can be the same wavelength as the exposure wavelength if absorption is to be used to determine the presence of a water-suspect area, or can be an emission wavelength of water that is excited by the exposure wavelength Such emission wavelength could include wavelengths of about 3.2 or 6.2 micrometers, for example, in which case the exposure wavelength should be at least one wavelength that is significantly absorbed by water and that is a shorter wavelength than about 3.2 or 6.2 micrometers to ensure that sufficient excitation energy is provided to any water molecules present to excite emission at such wavelengths.

In step S5, the generator 12 is positioned to expose a predetermined area of the structure 16 with the radiation 18 at the exposure and reference wavelengths. Such step can be preformed by a human user of the method using the stand 20 that supports the generator 12 and/or a view finder or visible radiation 18 generated by the generator 12, which reveals the area of the structure exposed by the radiation 18. The area of the structure 16 to be exposed by the radiation 18 can be marked with removable chalk or ink, for example, for use in positioning the senor unit 14.

In step S6, the sensor unit 14 is positioned to receive and sense electromagnetic radiation 22 from the predetermined area of the structure 16 to be exposed with the radiation 18. Step S6 can be performed by a human user of the method using the stand 35, optionally with a view finder to align the sensor unit 14 to receive the electromagnetic radiation 18 from the area of the structure exposed by the generator 12. Positioning of the sensor unit 14 can be facilitated if the generator 12 generates radiation 18 to include visible wavelengths, or the area to be exposed by the radiation 18 can be delineated with a marker to permit the user to position the sensor unit 14 to receive radiation 22 from the structure area exposed by radiation 18.

In step S7, the generator 12 generates the electromagnetic radiation 18, including the determined exposure and reference wavelengths. In step S8, the generator 12 exposes the predetermined area of the structure 16 to be analyzed for the presence of a water-suspect area, with the radiation 18, which includes the exposure and reference wavelengths. In step S9, the sensor unit 14 receives the radiation 22 from the exposed predetermined area of the structure 16. The received radiation 22 is based upon (or in other words derived from) the radiation 18 used to expose the structure 16.

In step S10, the sensor unit 14 senses an intensity level of the radiation 22 at the detection wavelength determined in step S4. The sensor unit 14 also senses an intensity level of the reference wavelength determined in step S4 from the radiation 22. In step S11 of FIG. 5B, the intensity levels of the exposure and reference wavelengths are compared.

In step S12, a determination is performed to establish whether the intensity levels of the detection and reference wavelengths differ by a predetermined amount. Preferably, the predetermined amount is at least ten percent (10%) of the reference wavelength's intensity, although this need not necessarily be so as long as the sensor(s) 26 are sufficiently sensitive to distinguish the detection and reference wavelengths' intensity levels if water is present in the exposed area of the structure. If the detection and reference wavelengths differ by the predetermined amount as determined by the performance of step S12, the method proceeds to step 13 in which a water-suspect area is determined to exist in the structure.

Figure 5B:
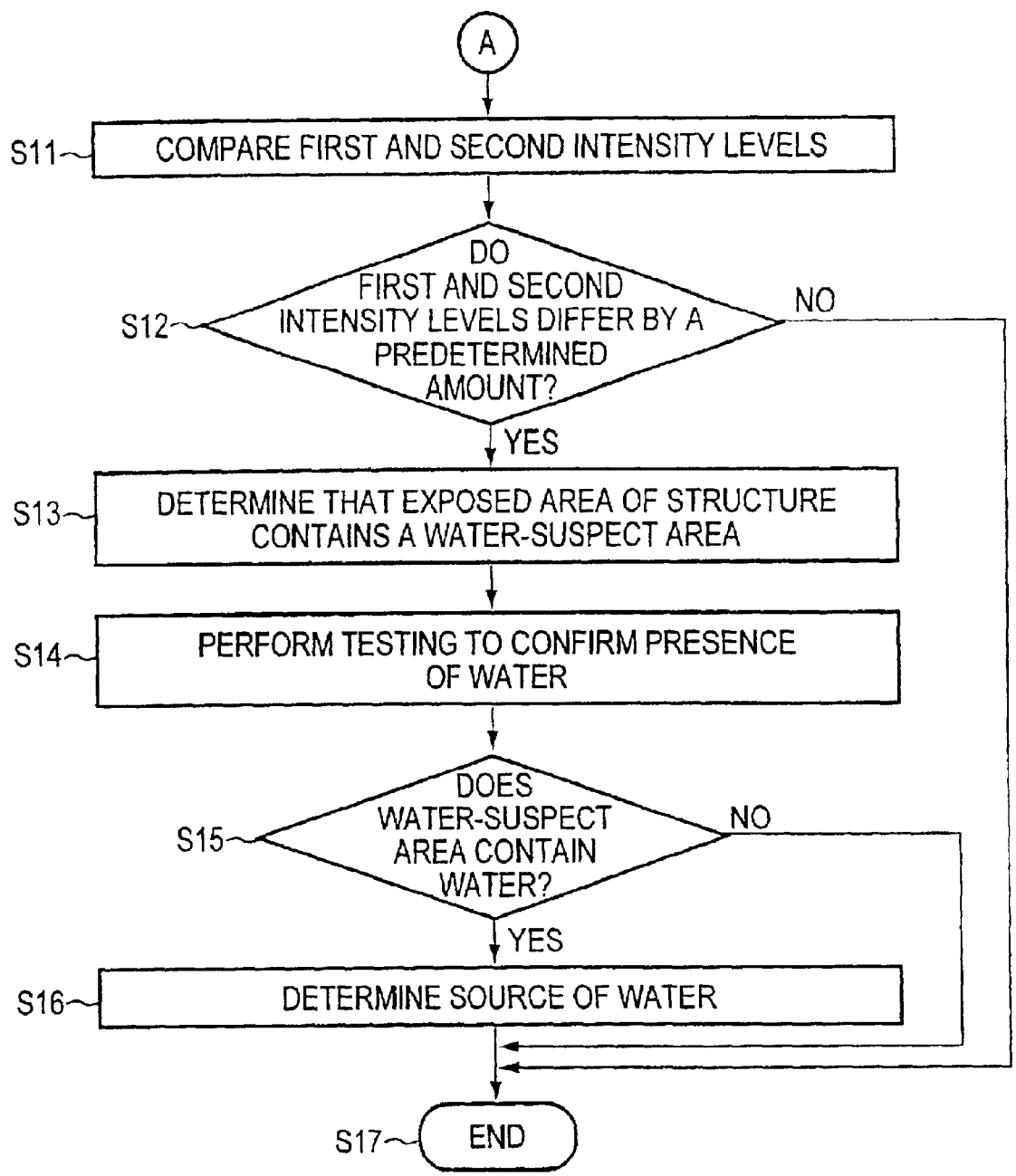

In step S14 of FIG. 5B, testing is performed to determine whether the water-suspect area includes water, or is doe to some other cause such as missing insulation or the presence of different structural materials. The presence of water in the water-suspect area in step S14 can be performed by the method of FIGS. 6A and 6B which will be described in detail later in this document. Alternatively, the testing to confirm the presence of water in the water-suspect area can also be performed with a moisture detector such as the model KJE-100 from Zeltex, Inc., of Hagerstown, Md. The testing to confirm the presence of water in step S14 can also be performed in numerous oilier ways, such as those set forth in U.S. Pat. No. 5,886,636 issued Mar. 23, 1999 to Patrick J. Toomey, the subject inventor. For example, the water-suspect area can be confirmed as containing water by scanning the water-suspect area with a capacitance meter, and determining whether the water-suspect area includes water, based on the reading of the capacitance meter. Alternatively, the water-suspect area can be confirmed as containing water by positioning an endoscopic probe in the structure in proximity to the water-suspect area, viewing the water-suspect area with the endoscopic probe, and determining whether the water-suspect area includes water, based on the viewing of the water-suspect area. As another alternative, the water-suspect area can be confirmed as including water using spaced conductive pins electrically coupled to a resistivity meter. The pins are inserted or driven into the water-suspect area of the structure, and a signal is applied to one of the pins. The resistivity meter senses the signal level on at least one other pin, and a determination is made to establish whether the water-suspect area of the structure is due to the presence of water, based on the signal level sensed by the resistivity meter. Because the presence of water generally enhances electrical conductivity in the structure's materials, the less resistance observed between the pins, the more likely water is present, and vice versa.

In step S15 of FIG. 5B, a determination is made to establish whether the water-suspect area in fact includes water, based on the testing performed in step S14. If the determination in step S15 is affirmative, the source of the water is determined in step S16.

Step S16 can be performed in numerous ways, including those disclosed in U.S. Pat. No. 5,886,636. More specifically, the source of the water can be determined by detecting the pH of water from the water-confirmed area with a litmus paper or pH meter, determining that the source of the water is not rain if the water is not relatively acidic. Alternatively, the source of the water in the water-confirmed area of the structure 16 can be determined by sensing the salinity of water from the water-confirmed area with a salinity meter, for example, determining that the water-confirmed area is due to ground water if the water is relatively saline, and determining that the water-confirmed are is not due to ground water if the water is not relatively saline. As another alternative, the generator 12 and the sensor unit 14 can be used, for example, in the performance of the method set forth later in this document with reference to FIGS. 7, 8A and 8B to determine whether the source of the water in the water-confirmed area of the structure is ground water.

After performance of step S16, or if the determination of either of steps S12 or S15 are negative, the method of FIGS. 5A and 5B ends in step S17. Steps S1–S13 can he performed either by the processor 28, the computer 36 or a human user of the method of FIGS. 5A and 5B. Steps S14–S17 of FIGS. 5A and 5B can be performed by a human user of the method using appropriate equipment and techniques such as those previously described.

In general, the method of FIGS. 5A and 5B accomplishes detection of water in an exposed area that is a portion of a wall, floor, ceiling or roof of a structure, for example. Therefore, the method of FIGS. 5A and 5B can be repeated to scan a relatively large part of a structure. To track where water detection using the method has been performed, a marker such as tape, or chalk or removable ink can be used to mark those areas where the method has been applied and those areas yet to be scanned.

Figure 6A:
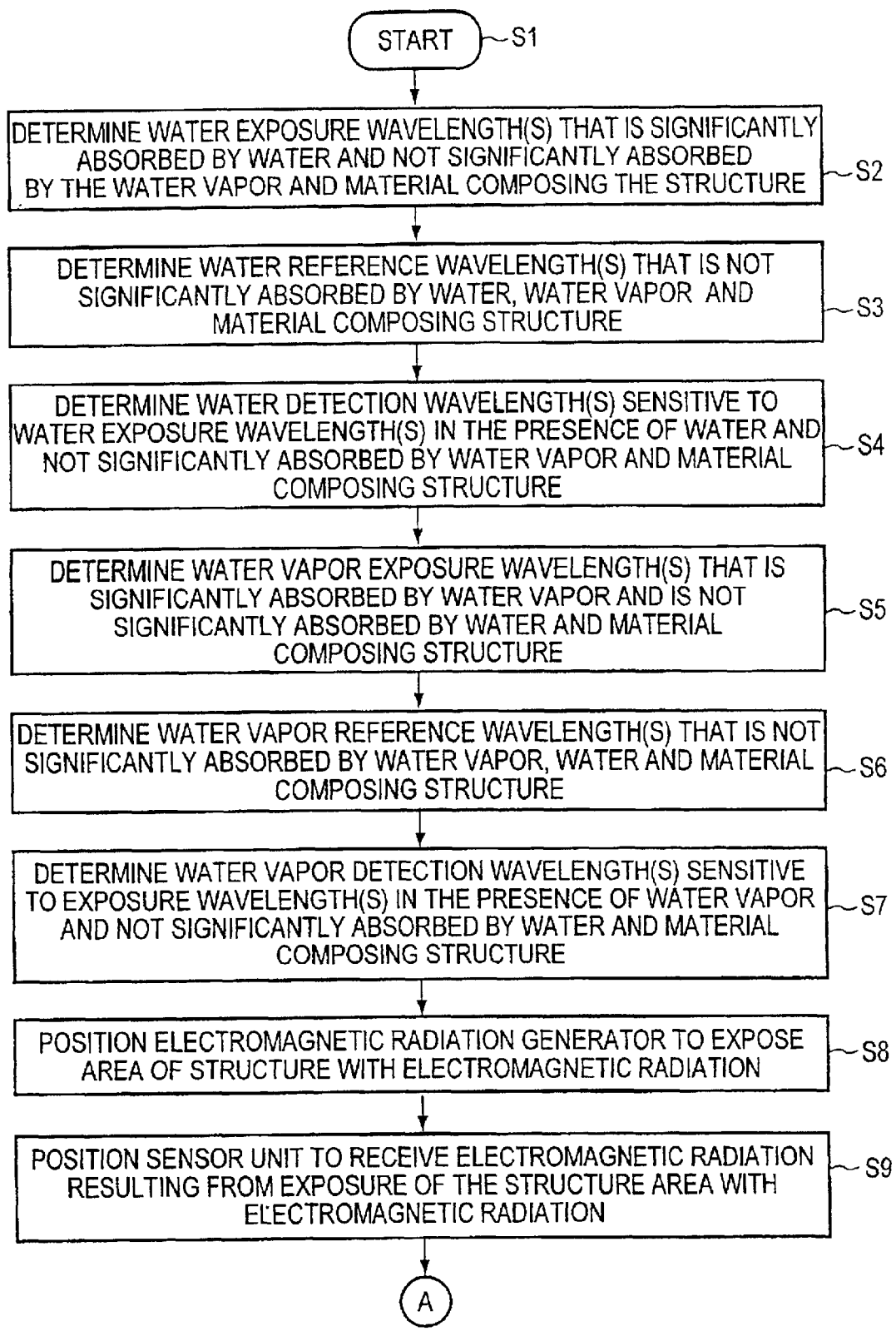
FIGS. 6A and 6B are relatively specific flow charts of an embodiment of the method for detecting the presence of water in a structure which uses exposure wavelengths for both water and water vapor.

In FIG. 6A, a method for detecting a water-suspect area in a structure that uses exposure wavelengths for both water and water vapor, begins in step S1. In step S2, a water exposure wavelength for the radiation 18 is determined. The water exposure wavelength is to be used to expose a predetermined area of a structure 16. The water exposure wavelength is determined to be a wavelength that is significantly absorbed by water and is not significantly absorbed by either water vapor or the material composing the structure 16. In step S3, at least one reference wavelength for water is determined that is not significantly absorbed by water, water vapor or the material composing the structure.

In step S4, a water detection wavelength is determined. The water detection wavelength is determined to be sensitive to the water exposure wavelength if water is present in the exposed area of the structure 16, and is not sensitive if water is absent from the exposed area of the structure 16. The detection and exposure wavelengths for water can be the same wavelength, or the detection wavelength for water can be an emission wavelength at which emission occurs from water as a result of absorption at the water exposure wavelength.

In step S5, an exposure wavelength for water vapor is determined, such wavelength being significantly by water vapor but not significantly absorbed by either water or the material composing the structure 16. In step S6, a reference wavelength(s) for water vapor is determined. The reference wavelength is one that is not significantly absorbed by water vapor or water, and that is also not significantly absorbed by the material composing the structure 16. Optionally, the reference wavelength can be one at which no emission from water occurs if the water detection wavelength is an emission wavelength of water that is excited by the water exposure wavelength. In step S7, a detection wavelength for water vapor is determined that is sensitive to the exposure wavelength for water vapor, and that is not significantly absorbed by either water or the material composing the structure 16.

Importantly, in steps S2 and S5, the exposure wavelengths that are significantly absorbed by water and water vapor can be determined to be wavelengths that are related to one another (i.e., wavelengths related to the same molecular absorption mechanics such as a particular mode of molecular vibration), but that are shifted in wavelength by the transition of water between the liquid and vapor phases. Such exposure wavelengths can be used as highly effective indicators of the presence of water in a structure. Exemplary exposure wavelengths significantly absorbed by water and water vapor that exhibit this wavelength shift upon phase transition between water and water vapor include about 0.97 micrometers and 0.935 micrometers, 1.2 micrometers and 1.13 micrometers, 1.45 micrometers and 1.38 micrometers, and 1.94 micrometers and 1.86 micrometers, where the exposure wavelength pairs represent the wavelengths of significant absorption far water and water vapor, respectively.

The reference wavelengths for water and water vapor determined in steps S3 and S6 can be the same wavelength at about 1.06 micrometers or 1.66 micrometers (neither of these wavelengths is significantly absorbed by water, water vapor or many types of structure construction materials), although the reference wavelengths for water and water vapor need not be the same wavelength. Alternatively, if the water vapor detection wavelength is an emission wavelength, the water vapor reference wavelength is determined to be one at which no significant emission occurs from water exposed to the radiation 18 in addition to such wavelength not being significantly absorbed by either water or the material composing the structure 16.

In step S8 of FIG. 6A, the generator 12 is positioned to expose a predetermined area of the structure 16 to the electromagnetic radiation 18. If the generator 12 produces visible wavelengths, the exposed area of the structure 16 can be readily determined and the generator 12 positioned by a human user of the method with the stand 20, to expose a predetermined area of the structure. Optionally step S8 could also be performed with a view-finder mounted on the generator 12 which indicates the area of exposure of the radiation 18 generated by the generator 12, and such area can be marked with chalk, ink or other removable substance for use in positioning the sensor unit 14. The generator 12 can be positioned to expose a border between a water-suspect area and a relatively dry predetermined area of the structure 16, where the structure may be draying after the occurrence of a water problem, for example. At a border between a water-suspect area and a relatively dry predetermined area of the structure, both water and water vapor are usually present in significant and detectable concentrations.

In step S9, the sensor unit 14 is positioned to receive the electromagnetic radiation 22 that is based on the radiation 18, from the predetermined area of the structure 16 that is to be exposed. The sensor unit 124 can be positioned by a human user of the method using stand 35 and a view-finder mounted to the sensor unit 14, which indicates the field-of-view over which the sensor unit 14 receives the radiation 22 from the area of the structure 16 exposed by the radiation 18. Optionally, the sensor unit 14 can be positioned through the use of visible wavelengths included in the radiation 18 generated by the generator 12, which indicate the area of the structure 16 that is to be exposed. Alternatively, the sensor unit 14 can be positioned to receive the radiation 22 from the area of the structure 16 that is to be exposed with the radiation 18 using chalk or ink markings on the structure 16 made by using a view finder of the generator 12 that indicates the area of the structure that will be exposed by the radiation 18.

Figure 6B:
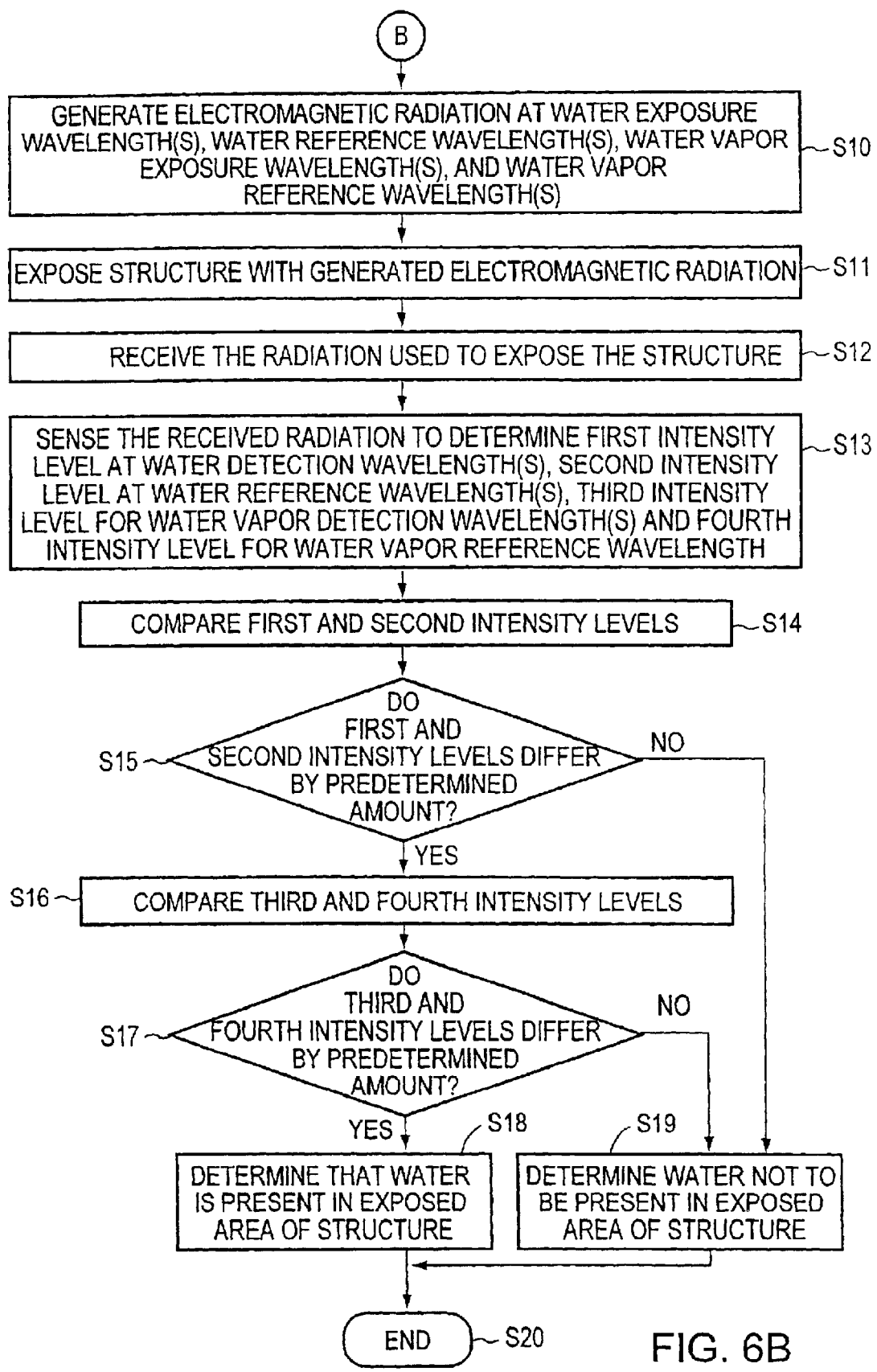

In step S10 of FIG. 6B, the generator 12 generates the electromagnetic radiation 18 that includes the determined exposure and reference wavelengths for both water and water vapor. In step S11, the generator 12 exposes the predetermined area of the structure 16 with the generated electromagnetic radiation 18. In step S12, the sensor unit 14 receives the radiation 22 from the exposed predetermined area of the structure 16 at the detection and reference wavelengths for both water and water vapor. In step S13, the sensor unit 14 senses the electromagnetic radiation 22 to determine radiation intensity levels for the detection and reference wavelengths for both water and water vapor. In step S14, the intensity levels of the water detection and reference wavelengths are compared.

In step S15, a determination is made to establish whether the intensity levels of the water detection and reference wavelengths differ by a predetermined amount. If the determination in step S15 is affirmative, in step S16, the radiation intensities of the water vapor detection and reference wavelengths are compared. In step S17, a determination is made to establish whether the intensity levels for the detection and reference wavelengths for water vapor differ by a predetermined amount. If the determination of step S17 is affirmative, in step S18, a determination is made that water is present in the exposed area of the structure 16. If the determination of steps S15 or S17 is negative, in step S19, water is determined not to be present in the exposed area of the structure 16. After performance of step S18 or S19, the method of FIGS. 6A and 6B ends in step S20. Steps S14–S20 can be performed by either the processor 28 of the sensor unit 14, the computer 36, or a human user of the method.

Figure 7:
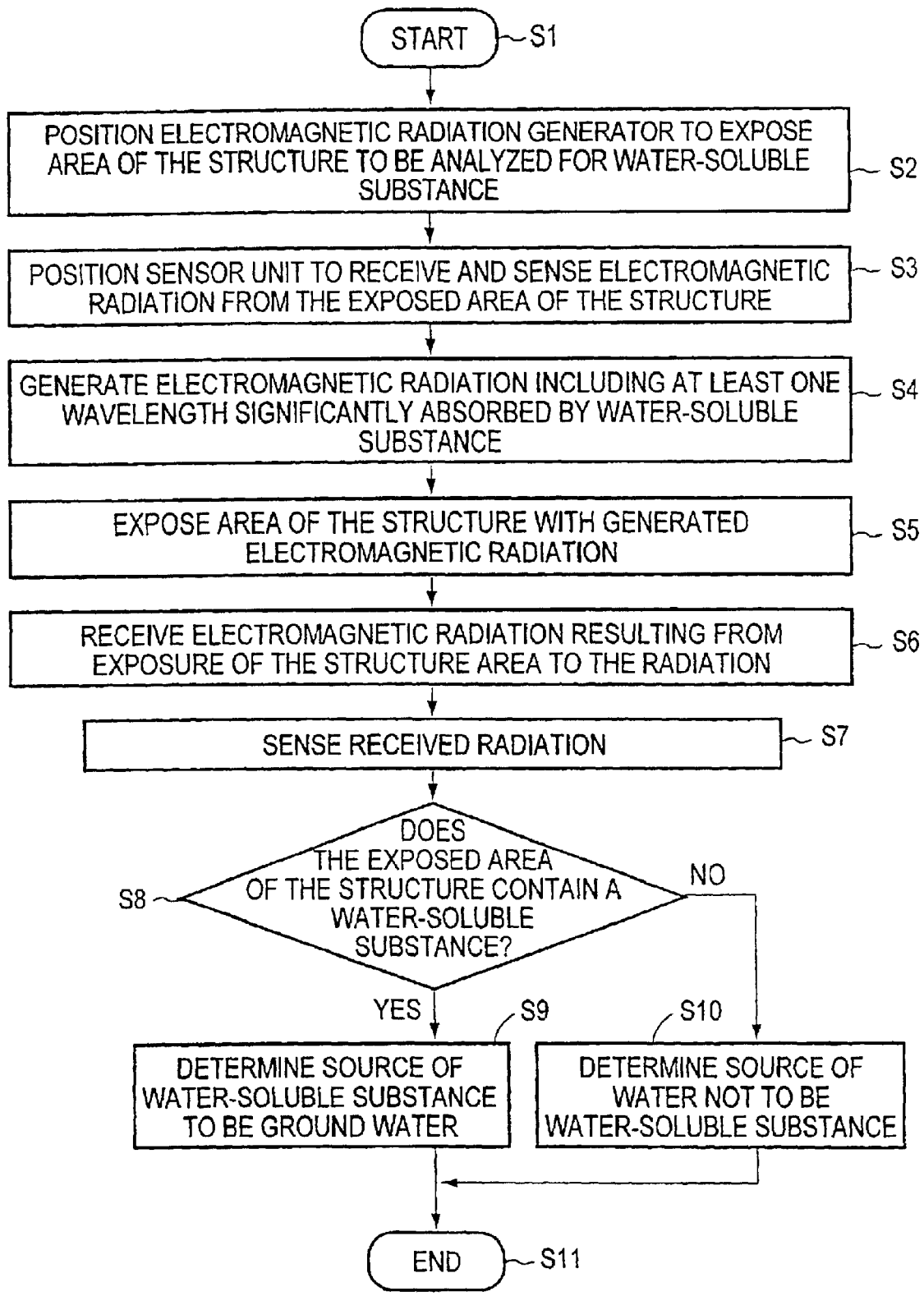
FIG. 7 is a flow chart of an embodiment of the method for determining whether a water-soluble substance is present in a structure.

A Method for Detecting the Presence (or Absence) of a Water-Soluble Substance Indicative of the Presence of Ground Water in Structure In FIG. 7, a method for detecting the presence of a water-soluble substance in a structure begins in step S1. In step S2, the generator 12 is positioned to expose a predetermined area of a structure 16 with the radiation 18. In step S3, the sensor unit 14 is positioned to receive and sense electromagnetic radiation 22 from the predetermined area of the structure 16 to be exposed by the radiation 18. In step S4, the generator 12 generates the electromagnetic radiation 18 that includes at least one exposure wavelength that is significantly absorbed by a water-soluble substance commonly present in earth. Such water-soluble substances include carbonates, chlorides, fluorides, sulfates and other minerals. Such water-soluble substances, if present in a structure, are generally highly indicative that the source of a water problem is ground water. In step S5, the generator 12 exposes the predetermined area of the structure with electromagnetic radiation 18 including the wavelength significantly absorbed by the water-soluble substance. In step S6, electromagnetic radiation 22 based on the radiation 18, is received by the sensor unit 14 from the exposed area of the structure 18. In step S7, the received radiation 22 is sensed by the sensor unit 14. In step S8, a determination is made to establish whether the water-soluble substance is present in the exposed area of the structure 16. If the result of the determination in step S8 is affirmative, in step S9, the source of water in the structure 16 is determined to be ground water. On the other hand, if the result of the determination of step S8 is negative, in step S10, the water source is determined not to be ground water. After performance of either steps S9 or S10, the method of FIG. 7 ends in step S11.

Figure 8A:
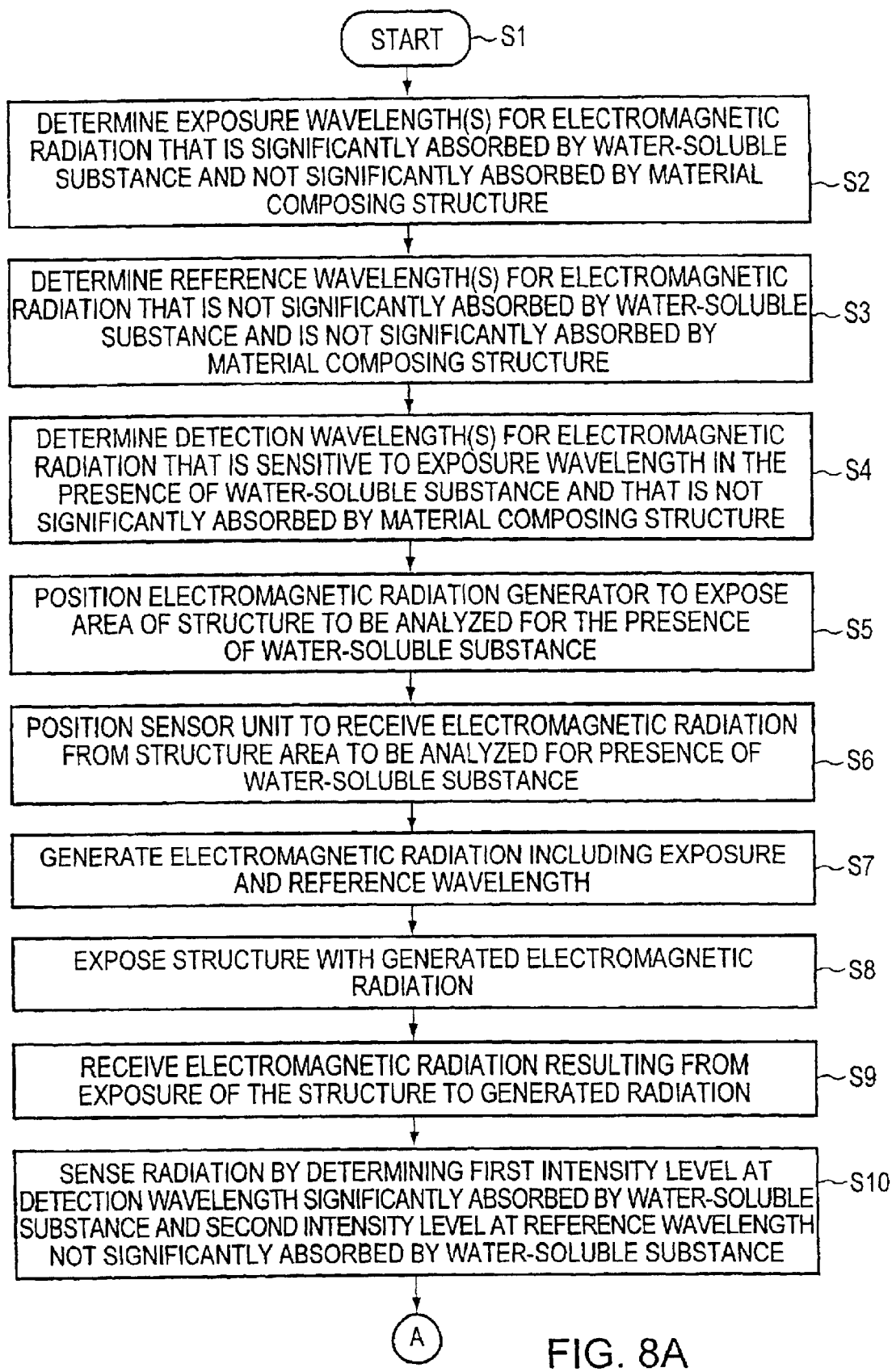
FIGS. 8A and 8B are relatively specific flow charts of an embodiment of the method for detecting the presence of a water-soluble substance in a structure.
Figure 8B:
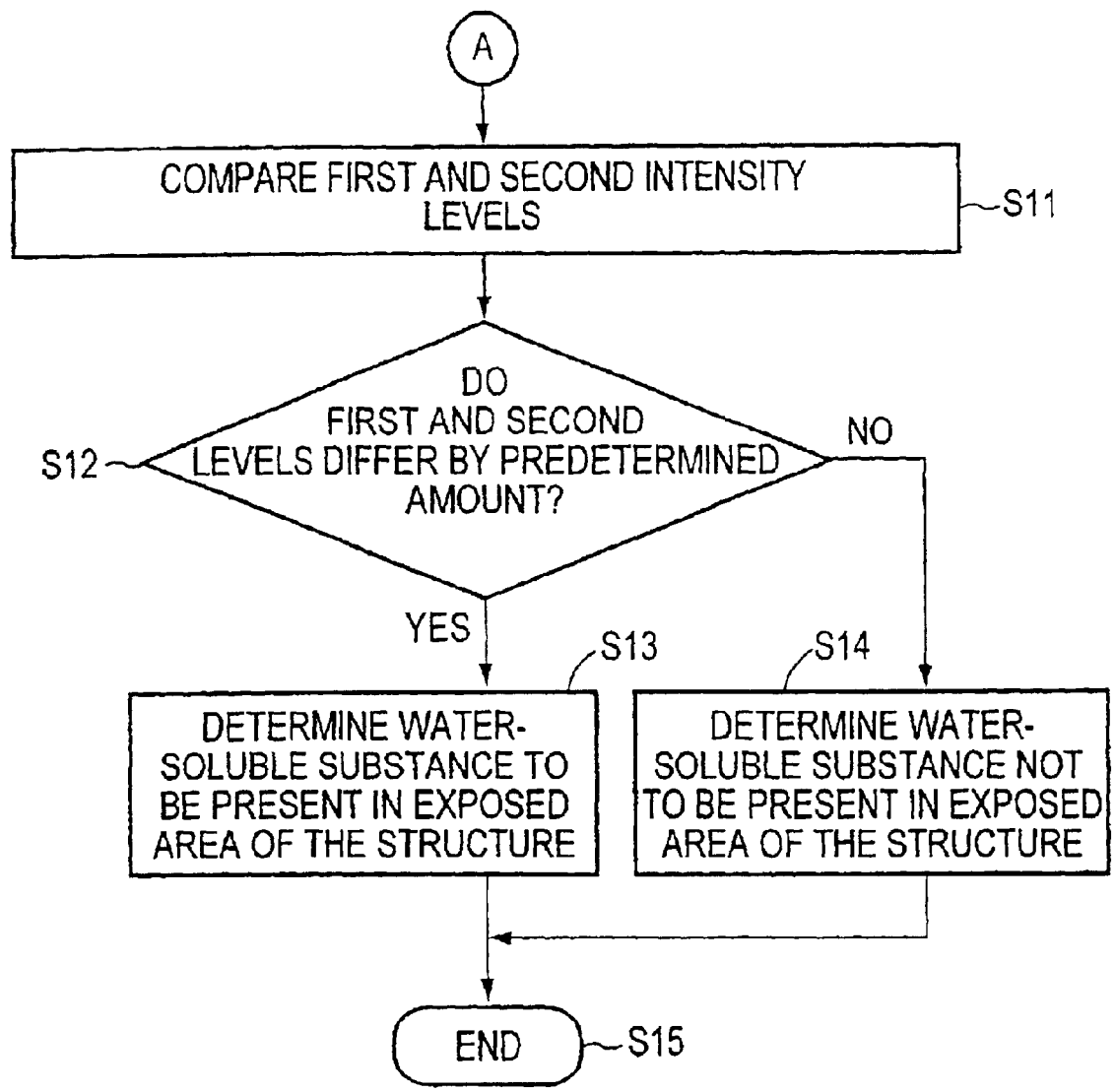

A Relatively Specific Embodiment of the Method for Detecting the Presence (or Absence) of a Water-Soluble Substance Indicative of the Presence of Ground Water in a Structure A relatively specific embodiment of the method for detecting the presence of a water-soluble substance in a structure 16 begins in step S1 of FIG. 8A. In step S2, exposure wavelength(s) for the electromagnetic radiation 18 is determined as one that is significantly absorbed by one or more water-soluble substances common in ground water, and that is not significantly absorbed either in water or the material composing the structure 16. The water-soluble substance can include at least one of gypsum ($CaSO_4H_2O$), anhydrite ($CaSO_4$), apatite ($Ca_5(PO_4)_4(OH,F,Cl)$), halite (NaCl), sylvite (KCl), calcite ($CaCO_3$), magnesite ($MgCO_3$), magnesium-iron (Mg—Fe) solid solution, siderite ($FeCO_3$), rhodocrosite ($MnCO_3$), smithsonite ($ZnCO_3$), dolomite ($CaMg(CO_3)_2$) and kutnahorite ($Ca(Mn,Mg,Fe)(CO_3)_2$), which generally have similar absorption spectra in the NIR and IR range. The exposure wavelength that is significantly absorbed by the water-soluble substance can include at least one wavelength of about 6.6 8.7, 9.6, 11.5, and 14 micrometers, for example (see internet, http://emma.la.asu.edu for graphs of absorption spectra). The exposure wavelength can also be one that excites emission from the water-soluble substance if present in the exposed area of the structure 16 at an emission wavelength, and should be a wavelength that is neither absorbed by water nor the material composing the structure 16. Care should be utilized in the determination of the exposure wavelength because some structure materials, particularly drywall and cements, can include gypsum as a constituent. In step S3, a reference wavelength(s) is determined for the electromagnetic radiation 18 that is not significantly absorbed by the water-soluble substance, water, and the material composing the structure 16. The reference wavelength that is not significantly absorbed by water-soluble substances, water, and many structure materials includes wavelengths from 7.5 to 8.0 micrometers. Alternatively, if the detection wavelength is an emission wavelength of the water-soluble substance, the reference wavelength(s) should be one at which no significant emission occurs and which is not significantly absorbed by water and the material composing the structure 16. In step S4, a detection wavelength is determined for the electromagnetic radiation 22 to be received from the exposed area of the structure. The detection wavelength(s) is one that is sensitive to the exposure wavelength in the presence of the water-soluble substance, but that is not significantly absorbed by water and the material composing the structure 16. In step S5, the electromagnetic generator 12 is positioned to expose a predetermined area of the structure 16 to be analyzed for the presence of the water-soluble substance. Step S5 can be performed by a human user of the method using the stand 20. Optionally, the generator 12 generates radiation 18 to include visible wavelengths which can be used to determine the area of the structure 16 that will be exposed by the radiation 18. Alternatively, the generator 12 can include a view finder to indicate the area of the structure 16 that will be exposed by the radiation 18. In step S6, the sensor unit 17 is positioned to receive and sense electromagnetic radiation from the structure area to be exposed with radiation 18. Step S6 can be performed by a human user of the method using the stand 35. Positioning of the sensor unit 14 is facilitated if the generator 12 can generate the radiation 18 to include visible wavelengths indicating the exposed area of the structure 16. Alternatively, the area of the structure 16 that will be exposed by the radiation of the generator 12 can be marked with chalk, ink or other removable substance so that the sensor unit 14 can be aligned to such marking using a view finder. The sensor unit 14 can include a view finder to assist the user in positioning the sensor unit to receive radiation 22 from the area of the structure 16 exposed by the radiation 18. In step S7, the generator 12 generates electromagnetic radiation 18 including the exposure and reference wavelengths for the water-soluble substance. In step S8, the sensor unit 14 senses the radiation 22 from the structure area exposed by the radiation 18 at the exposure and reference wavelengths. The radiation 22 is derived from the radiation 18 either as an unabsorbed portion thereof that is reflected or transmitted through the structure 16, or as an emission wavelength excited by the radiation 18. The sensor unit 14 senses the radiation 18 at the detection and reference wavelengths of the water-soluble substance to determine intensity levels for such wavelengths. In step S8, a predetermined area of the structure 16 is exposed with the generated radiation 18. In step S9, the radiation 22 that results from exposure of the structure 16 to the radiation 18, is received from the exposed area of the structure by the sensor unit 14. In step S10, the received radiation 22 is sensed by the sensor unit 14 to determine a first intensity level at the detection wavelength and a second intensity level at the reference wavelength. In step S11 of FIG. 8l3, the intensity levels of the detection and reference wavelength(s) for the water-soluble substance are compared. In step S12, a determination is made to establish whether the intensity levels of the detection and reference wavelengths of the water-soluble substance differ by the predetermined amount. If the determination of step S12 is affirmative, in step S13, the water-soluble substance is determined to be present in the exposed area of the structure. Conversely, if the determination in step S12 is negative, in step S14, the water-soluble substance is determined not to be present in the exposed area of the structure 16. After performance of steps S13 or S14, the method of FIGS. 8A and 8B ends in step S15. Steps S11–S15 can be performed by either the processor 28, the computer 36 or a human user of the method.

A Method for Detecting the Presence (or Absence) of Fungi in a Structure

Figure 9:
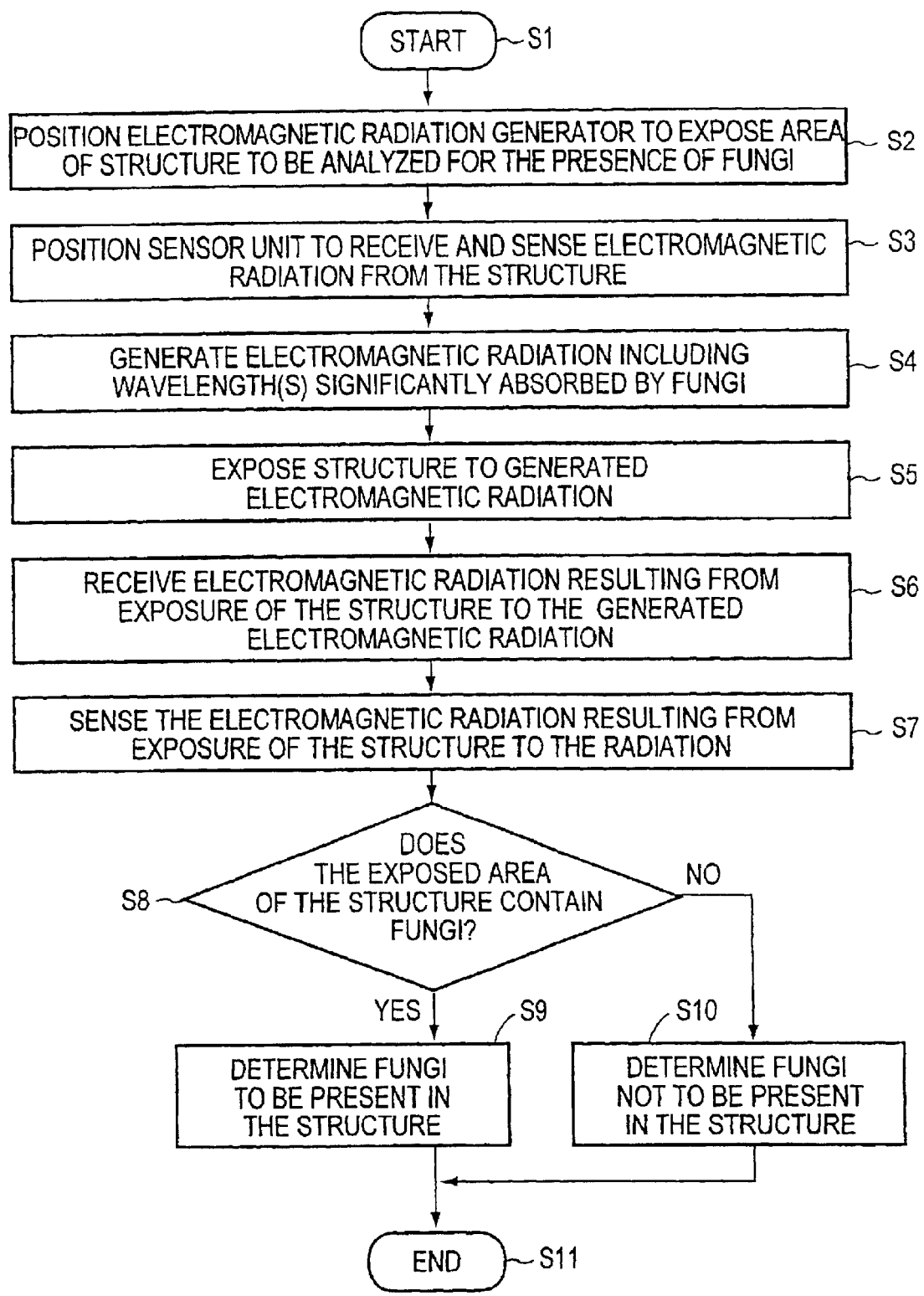
FIG. 9 is a flow chart of an embodiment of the method for detecting the presence of fungi in a structure.

In FIG. 9, a method for detecting the presence of a fungi in a structure begins in step S1. In step S2, the generator 12 is positioned to expose a predetermined area of the structure 16. In step S3, the sensor unit 14 is positioned to receive and sense electromagnetic radiation 22 from the exposed area of the structure. In step S4, the generator 12 generates the electromagnetic radiation 18 including at least one wavelength significantly absorbed by fungi. In step S5, the generator 12 exposes the predetermined area of the structure 16 with the electromagnetic radiation 18 including at least one wavelength that is significantly absorbed by Fungi. In step S6, the sensor unit 14 receives the electromagnetic radiation 22 from the exposed area of the structure 16. The received radiation 22 is based on or derived from the radiation 18, and can be a portion of such radiation which is reflected from or transmitted through the exposed area of the structure, or can be radiation at an emission wavelength of fungi that is excited by the radiation 18. In step S7, the sensor unit 14 senses the received radiation 22. In step S8, a determination is performed to establish whether the exposed area of the structure 16 contains fungi. If the determination in step S8 is affirmative, in step S9, fungi is determined to be present in the structure 16. On the other hand, if the result of the determination in step S8 is negative, in step SID, fungi is determined not to be present in the structure 16. After performance of steps S9 or S10, in step S11, the method of FIG. 9 ends. Steps S8–S11 can be performed by either the processor 28, the computer 36 or a human user of the method.

Figure 10A:
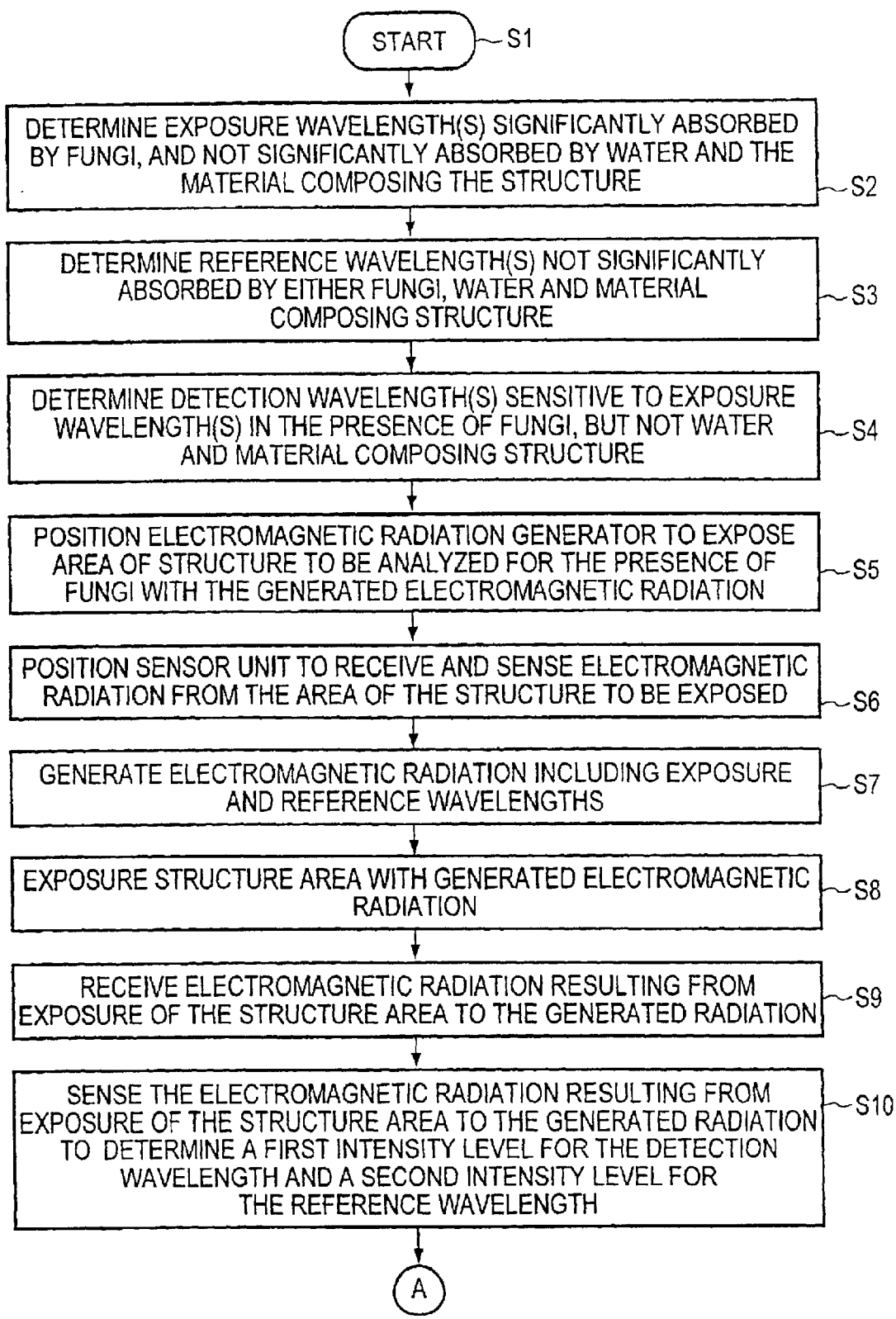
FIGS. 10A and 10B are relatively specific flow charts of an embodiment of the method for detecting fungi in a structure.
Figure 10B:
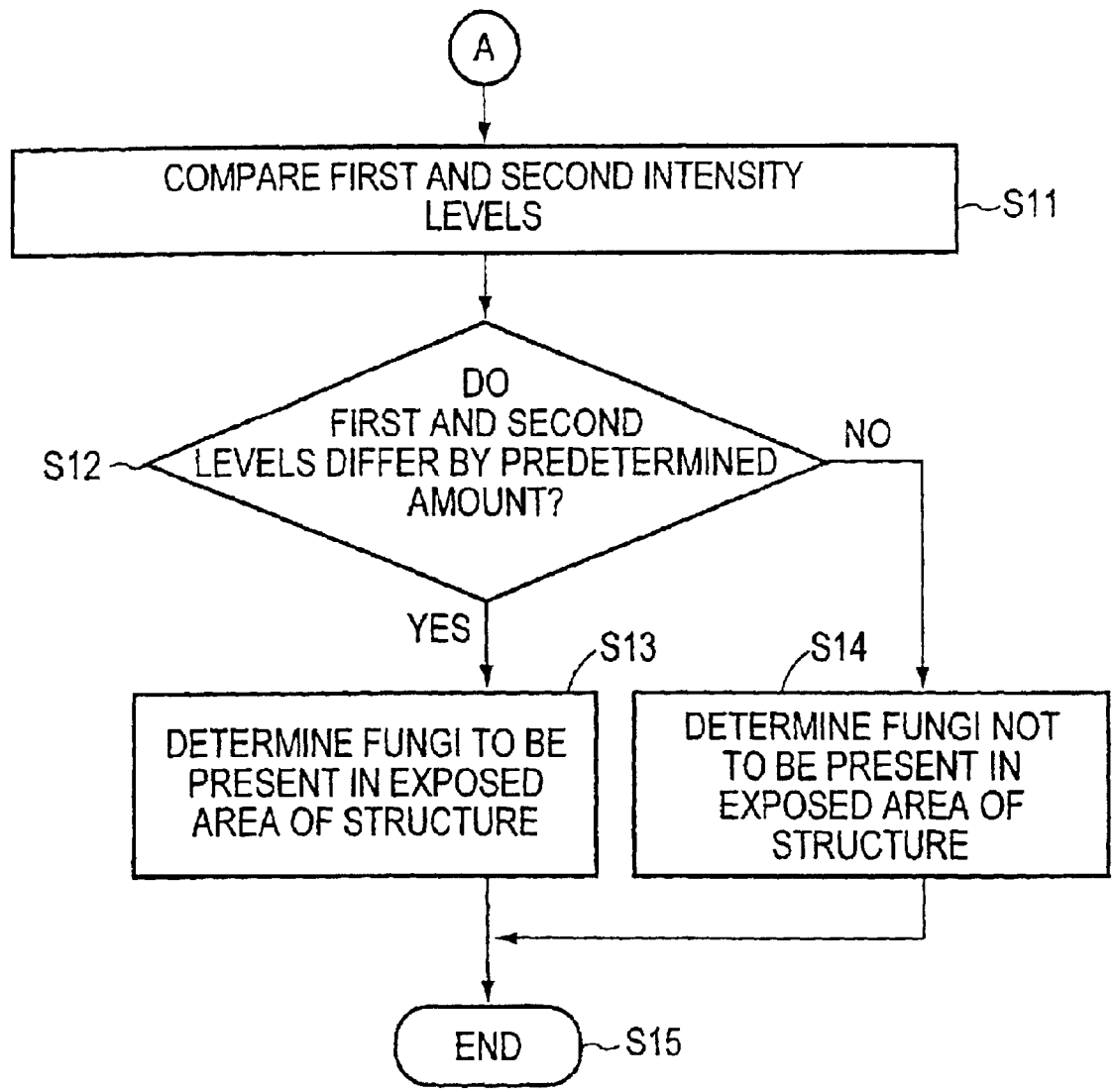

A Relatively Specific Embodiment of the Method for Detecting the Presence (or Absence) of Fungi in a Structure A relatively specific embodiment of the method for detecting the presence of Fungi in a structure 16 begins in step S1 of FIG. 10A. In step S2, exposure wavelength(s) significantly absorbed by fungi, and not significantly absorbed by either water or the material composing the structure 16, are determined. Alternatively, the exposure wavelength can be determined to be one that excites emission at an emission wavelength from fungi if present in the area of the structure to be exposed. For example, the exposure wavelength could be generated at 289 nanometers (nm) using a frequency-shifted 266 nm diode-pumped Nd:YAG laser as the generator 12 which excites emission from tryptophan at an emission wavelength of from 300 nm to 400 nm. Because tryptophan is present in all biological materials, its presence in the structure 16 is indicative of the presence of fungi therein. In step S3, a reference wavelength (s) not significantly absorbed by fungi, water and the material composing the structure 16, is determined. Such reference wavelengths could include 1.06 and 1.66 micrometers. Alternatively, if the exposure wavelength excites emission from fungi, the reference wavelength can be one at which no significant emission occurs, and that is not significantly absorbed by water or the material composing the structure 16. In step S4, a detection wavelength(s) is determined that is sensitive to the exposure wavelength(s) in the presence of fungi, but not to water and the material composing the structure 16. The detection wavelength(s) can be the same as the exposure wavelength(s), or alternatively, can be an emission wavelength(s) of fungi that is excited by the exposure wavelength(s). In step S5, the generator 12 is positioned to expose a predetermined area of the structure 16. Step S5 can be performed by a human user of the method using the stand 20. Optionally, the generator 12 can generate radiation 18 including visible wavelengths that permit such user to determine the area of the structure 16 that will be exposed by the radiation 18. The generator 12 could also include a view finder to permit the user to determine the area of the structure 16 that will be exposed by the generator 12. In step S6, the sensor unit 14 is positioned to receive and sense the electromagnetic radiation 22 from the exposed area of the structure 16. Step S6 can be performed by the user by moving the stand 35 to position the sensor unit 14 to receive radiation 22 from the area of the structure 16 that is to be exposed with the radiation 18. Alternatively, the sensor unit 14 can include a view finder to assist in positioning the sensor unit 14 on the stand 35 so that it will receive the radiation 22 from the area of the structure 16 that is exposed by the radiation 18. This operation is facilitated if the generator 12 generates the radiation 18 to include visible wavelengths that can readily indicate the exposed area of the structure 16 to the user. The area of the structure 16 that is to be exposed by radiation 18 can also be marked with a removable substance such as chalk or ink to assist in alignment of the sensor unit 14 relative to such marking. In step S7, the generator 12 generates the electromagnetic radiation 18 including the determined exposure and reference wavelengths. In step S8, the generator 12 exposes the predetermined area of the structure 16 with the generated radiation 18. In step S9, the sensor unit 14 receives the radiation 22 resulting from exposure of the structure with the radiation 18, from the exposed area of the structure 16. In step S10, the sensor unit 14 senses the received radiation 22 to determine a first intensity level for the detection wavelength(s) and a second intensity level for the reference wavelength. In step S11 of FIG. 10B, the first and second intensity levels are compared. In step S12, a determination is made to establish whether the first and second intensity levels differ by a predetermined amount. If the determination in step S12 is affirmative, in step S13, fungi is, determined to be present in the exposed area of the structure 16. On the other hand, if the determination of step S12 is negative, in step S14, fungi are determined not to be present in the exposed area of the structure 16. After performance of steps S13 or S14, the method of FIGS. 10A and 10B ends in step S15. Steps S11–S15 can be performed either by the processor 28, the computer 36 or a human user of the method of FIGS. 10A and 10B.

The many features and advantages of the present invention are apparent from the detailed specification and thus, it is intended by the appended claims to cover all such features and advantages of the described methods which follow in the scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the scope of the invention.

Industrial Applicability

The disclosed methods have industrial applicability in the detection and remediation of water problems in a building, house, or other structure. The disclosed methods also can be used to detect mold or fungi that inhabit moist areas of structures, and that can pose health concerns to person living or working in their presence.

What is claimed is:

1. A method comprising the steps of:

a) generating with a generator electromagnetic radiation including at least one predetermined exposure wavelength that is both significantly absorbed by water and is not significantly absorbed by material composing a structure, and at least one predetermined reference wavelength that is neither significantly absorbed by water nor the material composing the structure;

b) exposing with the generator a predetermined area of the structure with the generated electromagnetic radiation;

c) sensing with a sensor unit at least a portion of the generated radiation from the exposed area of the structure to determine a first intensity level of the radiation at the predetermined exposure wavelength, and a second intensity level at the predetermined reference wavelength;

d) comparing the first and second intensity levels; and
e) determining that the predetermined area includes water if the first and second levels differ by at least a predetermined amount, and
   a. testing to confirm that the predetermined area includes water, and if water is confirmed, determining the source of the water detected by
      i. exposing a water-confirmed area to second electromagnetic radiation including at least one exposure wavelength that is significantly absorbed by at least one water-soluble substance and that is not significantly absorbed by material composing the structure, and at least one reference wavelength not significantly absorbed by either the water-soluble substance or the material composing the structure;
      ii. sensing the second electromagnetic radiation from the water-confirmed area at the exposure wavelength to determine a third intensity level, and at the reference wavelength to determine a fourth intensity level;
      iii. comparing the third and fourth intensity levels;
      iv. determining the source of water to be ground water if the third and forth intensity levels differ by at least a second predetermined amount; or
f) determining that the predetermined area includes no water if the first and second levels do not differ by at least the undetermined amount or if water is not confirmed by testing.

2. The method of claim 1, wherein the water-soluble substance includes at least one of gypsum, anhydrite, apatite, halite, sylvite, calcite, magnesite, magnesium-iron solid solution, siderite, rhodocrosite, smithsonite, dolomite, and kutnahorite.

3. The method of claim 1, wherein the exposure wavelength includes at least one wavelength of about 6.6, 8.7, 9.6, 11.5, and 14 microns.

4. The method of claim 1, wherein the reference wavelength is in a range from 7.5 to 8.0 microns.

5. The method of claim 1, wherein the predetermined exposure and reference wavelengths are in a range from about $10^{-2}$ to about $10^8$ microns.

6. The method of claim 1, wherein the predetermined area is at least one square meter.

7. The method of claim 1, wherein the structure is a house.

8. The method of claim 1, wherein the structure is a building.

9. The method of claim 1, prior to performance of steps a)–f), further comprising the steps of:
   positioning the generator to expose the predetermined area of the structure with the electromagnetic radiation; and
   positioning the sensor unit to receive and sense the portion of the generated radiation from the exposed area of the structure.

10. The method of claim 9, wherein the generator and sensor unit are positioned so that the sensor unit receives the portion of the generated radiation from the exposed area of the structure by reflection from the exposed area.

11. The method of claim 9, wherein the generator and sensor unit are positioned so that the sensor unit receives the portion of the generated radiation transmitted through the exposed area of the structure.

12. The method of claim 1, wherein the generator includes a quartz halogen lamp.

13. The method of claim 1, wherein the generator generates radiation with a power of between ten and one-thousand Watts.

14. The method of claim 1, wherein the generator is supported in a fixed position during the performance of step b) with a photographic stand.

15. The method of claim 1, wherein the sensor unit includes a spectrometer.

16. The method of claim 1, wherein the sensor unit includes a spectroradiameter.

17. The method of claim 1, wherein the sensor unit includes a hyperspectral imaging system.

18. The method of claim 1, wherein the predetermined exposure wavelength includes at least one wavelength at about 0.76, 0.97, 1.19, 1.45, 1.94, 2.55, 2.7, 5.5 or 10.7 microns.

19. The method of claim 1, wherein the predetermined reference wavelength includes at least one wavelength at about 1.06 or 1.66 nanometers.

* * * * *